United States Patent
Mori

(10) Patent No.: US 9,402,236 B2
(45) Date of Patent: Jul. 26, 2016

(54) BASE STATION APPARATUS

(71) Applicant: FUJITSU LIMITED, Kawasaki-shi, Kanagawa (JP)

(72) Inventor: Masaru Mori, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 303 days.

(21) Appl. No.: 14/060,697

(22) Filed: Oct. 23, 2013

(65) Prior Publication Data

US 2014/0171063 A1  Jun. 19, 2014

(30) Foreign Application Priority Data

Dec. 13, 2012 (JP) ................................ 2012-272427

(51) Int. Cl.
*H04W 24/04* (2009.01)
*H04W 52/24* (2009.01)
*H04W 52/20* (2009.01)

(52) U.S. Cl.
CPC ............ *H04W 52/241* (2013.01); *H04W 52/20* (2013.01); *Y02B 60/50* (2013.01)

(58) Field of Classification Search
CPC .............................. H04W 24/04; H04W 52/38
USPC .................... 455/423; 370/329, 221
See application file for complete search history.

(56) References Cited

U.S. PATENT DOCUMENTS

| | | | | |
|---|---|---|---|---|
| 8,812,046 B2 * | 8/2014 | Huang | ................... | H04B 7/024 455/422.1 |
| 2009/0131113 A1 | 5/2009 | Shiizaki et al. | | |
| 2010/0298002 A1 | 11/2010 | Masuda et al. | | |
| 2012/0224470 A1 * | 9/2012 | Jeong | ................ | H04W 72/0453 370/221 |
| 2012/0307780 A1 * | 12/2012 | Mochizuki | ............ | H04L 1/1812 370/329 |
| 2013/0083714 A1 | 4/2013 | Joko et al. | | |
| 2013/0315157 A1 * | 11/2013 | Krishnamurthy | ..... | H04L 5/0053 370/329 |
| 2014/0328162 A1 * | 11/2014 | Jeong | ................ | H04W 72/0453 370/221 |

FOREIGN PATENT DOCUMENTS

| | | |
|---|---|---|
| JP | 2009-124335 | 6/2009 |
| JP | 4829970 | 12/2011 |
| JP | 2012-004999 | 1/2012 |

OTHER PUBLICATIONS

3GPP TR 36.902 V9.3.1, 3rd Generation Partnership Project, Technical Specification Group Radio Access Network; Evolved Universal Terrestrial Radio Access Network (E-UTRAN); Self-configuring and self-optimizing network (SON) use cases and solutions (Release 9) Mar. 2011.
3GPP TS 36.423 V11.2.0, 3rd Generation Partnership Project; Technical Specification Group Radio Access Network; Evolved Universal Terrestrial Radio Access Network (E-UTRAN); X2 application protocol (X2AP) (Release 11) Sep. 2012.

* cited by examiner

*Primary Examiner* — Lester Kincaid
*Assistant Examiner* — Gary Lafontant
(74) *Attorney, Agent, or Firm* — Fujitsu Patent Center

(57) ABSTRACT

A method of transmission power control is performed by a radio device along with another radio device being connected to a radio control device, the radio device forming a second cell overlaid with a first cell which is formed by the another radio device and a first frequency band is used. The method comprises monitoring a failure state of the other radio device, and reducing transmission power of radio waves to be transmitted to the second cell when the failure state of the another radio device is detected.

10 Claims, 20 Drawing Sheets

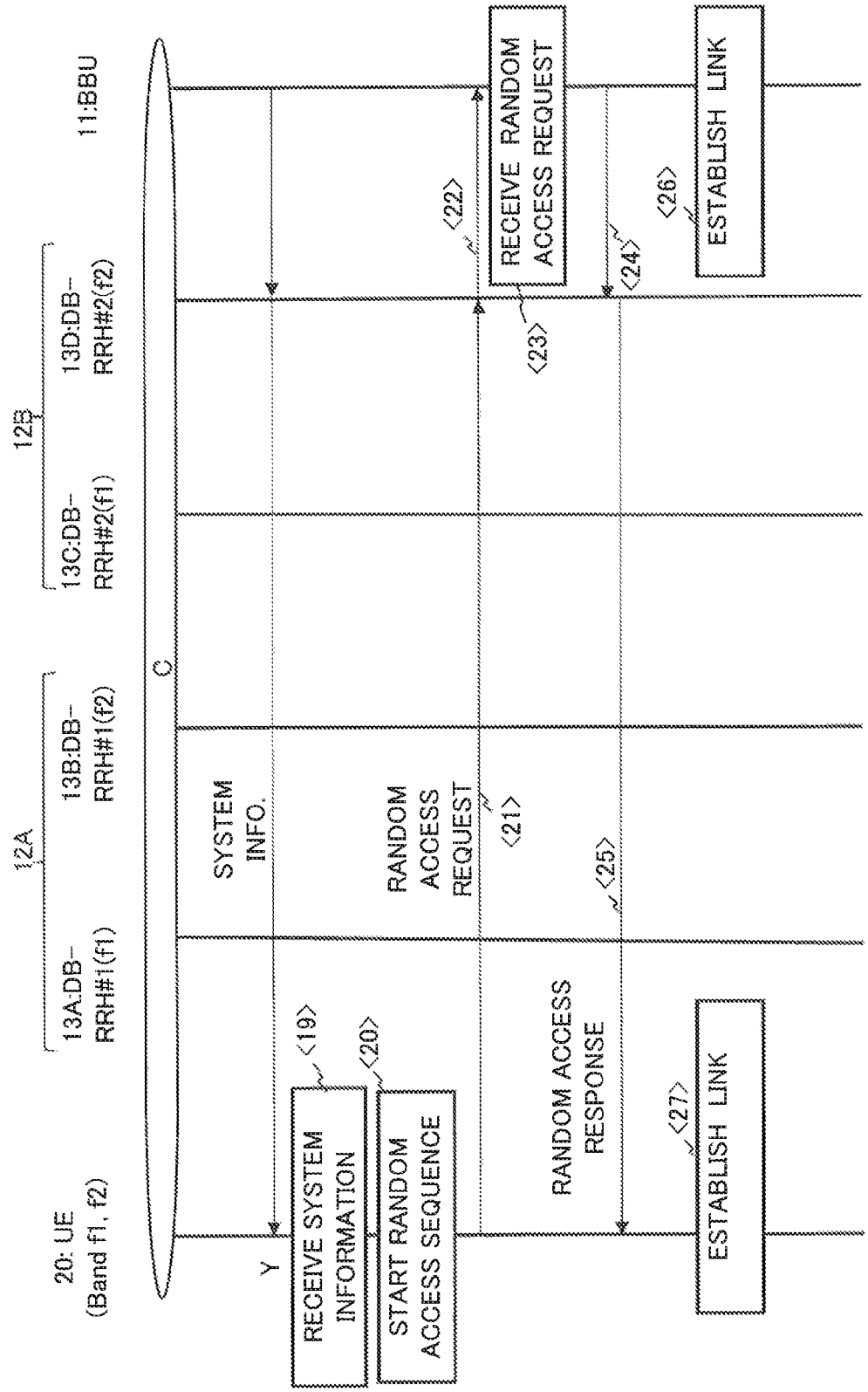

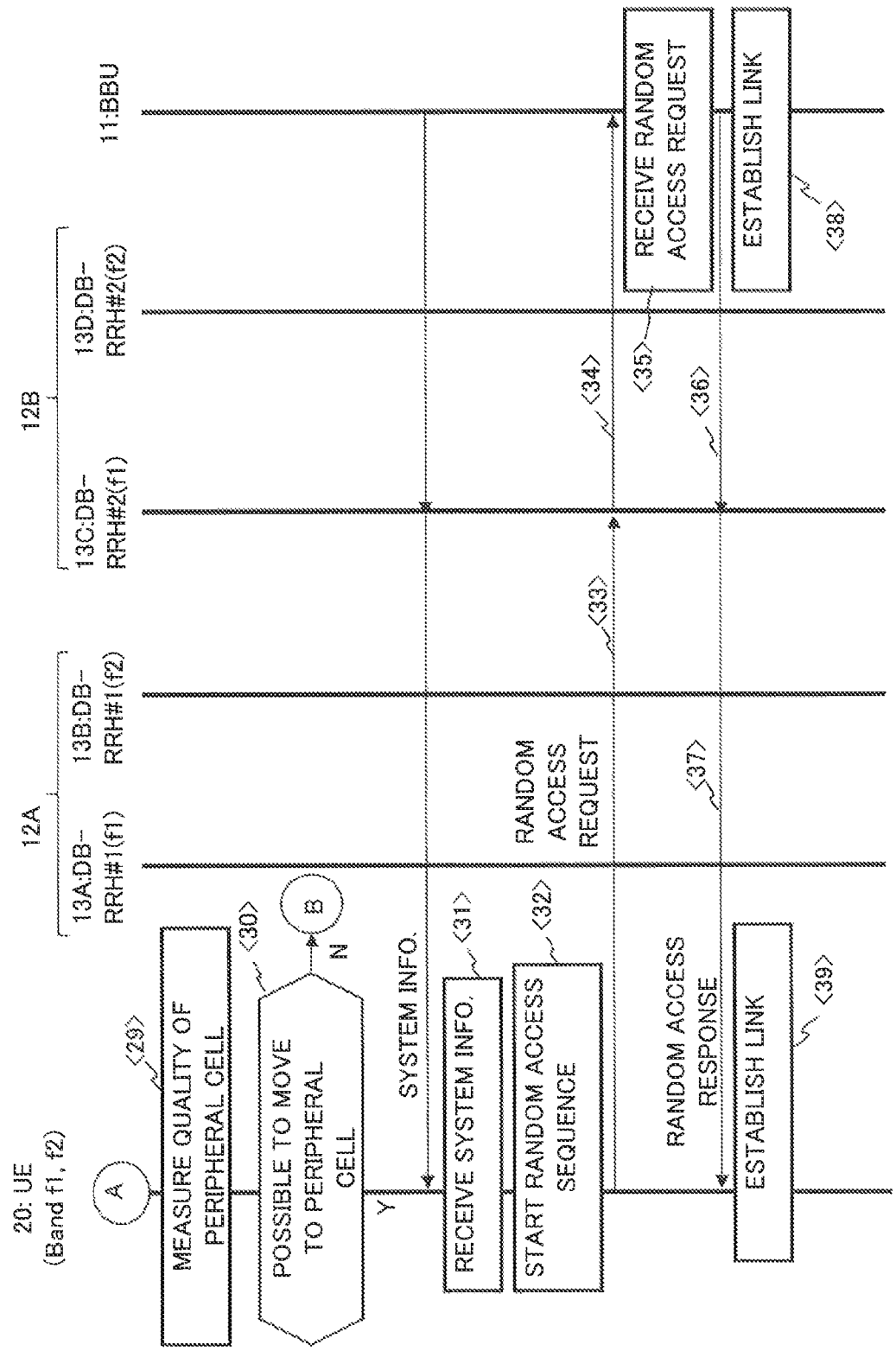

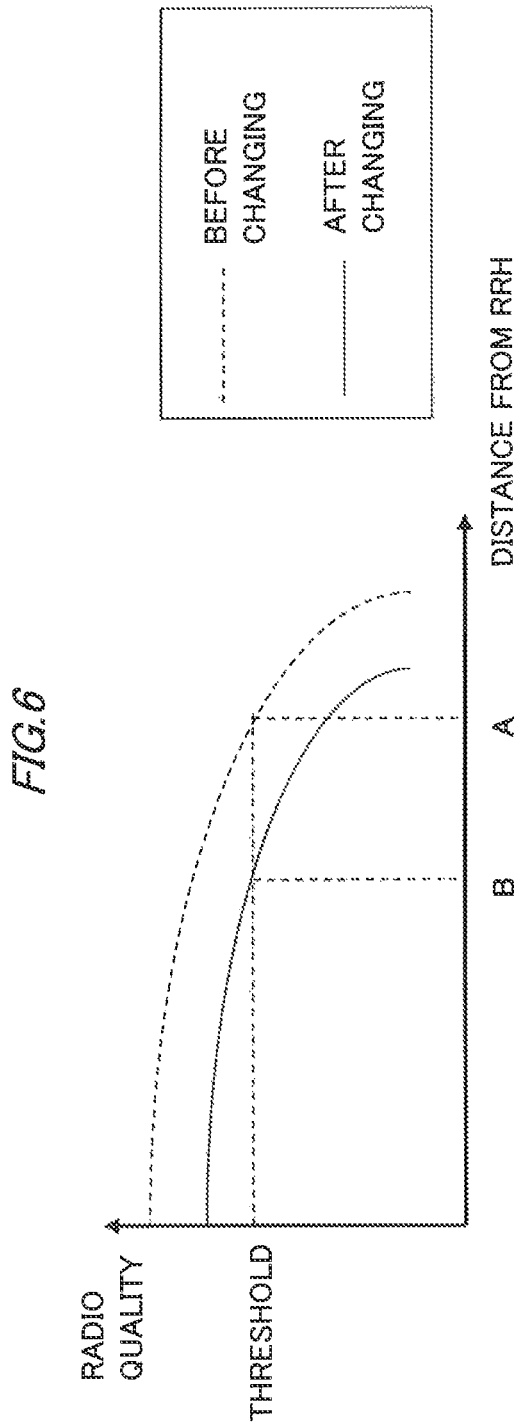

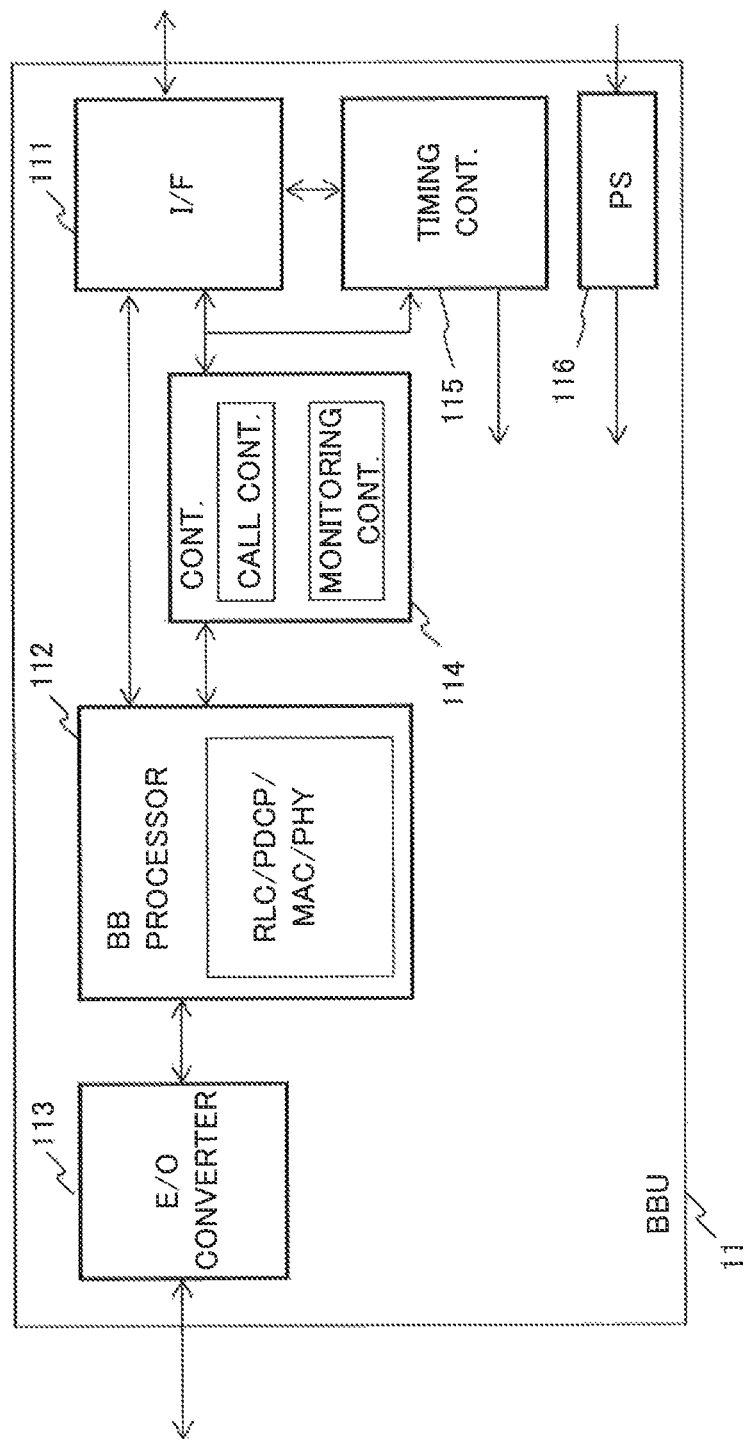

BASE STATION APPARATUS

CROSS-REFERENCE TO RELATED APPLICATION

This application is based upon and claims the benefit of priority of the prior Japanese Patent Application No. 2012-272427, filed on Dec. 13, 2012, the entire contents of which are incorporated herein by reference.

FIELD

Disclosure is related to a base station apparatus.

One of radio communication systems specified by the 3GPP (3rd Generation Partnership Project) is LTE (Long Term Evolution) released as the 3GPP Release 8. In the LTE, a base station apparatus (referred to as "eNode B") is divided into a radio unit (radio device) including an antenna, and a control/baseband unit (also referred to as a "radio controller (radio control device)" or a "baseband unit"). The radio unit is coupled to the control/baseband unit via communication interfaces.

In the LTE, the radio unit (radio device) is called "Radio Remote Head (RRH)," and the control/baseband unit (radio control device) is called "Baseband Unit (BBU)." The BBU may be called "Base station Digital processing Equipment (BDE)," and the RRH may be also called "Radio processing Equipment (RE)."

For more information, see Japanese Patent No. 4829970 and Japanese Laid-open Patent Publication No. 2009-124335.

In some cases, the BBU is operated under such an environment that the BBU is connected to two RRHs, each of the two RRHs uses a different frequency band, and cells formed by the RRHs are overlaid with each other. This environment is prepared, for example, for the purpose of applying a carrier aggregation technique that uses plural different frequency bands as a single frequency band so as to enhance an average throughput.

In this environment, the BBU carries out signal processing related to communications using a first frequency band used at one of the RRHs, and also carries out signal processing related to communications using a second frequency band used at the other RRH. In the above environment, when a failure causes one of the RRHs, mobile terminals under the RRH is not able to continue communications with the RRH by disconnect of a link which uses radio resources of the frequency band used by the RRH. In this case, the mobile terminals measure radio field intensities from other cells (a cell of the other RRH overlaid with the cell of the RRH, and adjacent cells) received at the current position of the mobile terminal, and attempt to connect to a cell (base station) having the strongest radio field intensity, for example.

When the strongest radio field intensity is transmitted from the other RRH, the mobile terminals connected to the RRH attempt reconnection with the other RRH at a time. For this reason, connection requests related to the second frequency band, which are transmitted from the mobile terminals, are concentrated on (become congesting in) the BBU, and thus the BBU may be put in an overload state.

SUMMARY

One of embodiments of the invention is a base station apparatus. The base station apparatus includes:

a first radio device to form a first cell that a first frequency band is used;

a second radio device to form a second cell that is overlaid with the first cell and is used a second frequency band different from the first frequency band; and a radio control device being directly or indirectly connected to the first radio device and to the second radio device, and to perform processing of signals transmitted to and received from the first radio device, and of signals transmitted to and received from the second radio device;

a monitor to monitor a failure state of the first radio device and/or the second radio device; and a controller, when the monitor detects the failure state of the first radio device or the second radio device, to reduce a transmission power to the first cell or the second cell formed by the first radio device or the second radio device which is not detected the failure state.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A and 4B illustrate a sequence of transmission power control on a mobile terminal that may selectively use plural frequency bands;

FIG. 5 illustrates a sequence of transmission power control on a mobile terminal that may selectively use plural frequency bands;

FIG. 6 is a drawing explaining change in the transmission power;

FIG. 8 illustrates an example of a functional block configuration of a BBU;

DESCRIPTION OF EMBODIMENTS

Hereinafter, description will be provided on embodiments of the present invention with reference to drawings. Configurations of the embodiments are exemplified, and the present invention is not limited to the embodiments.

First Embodiment

<System Configuration>

Figure 1:
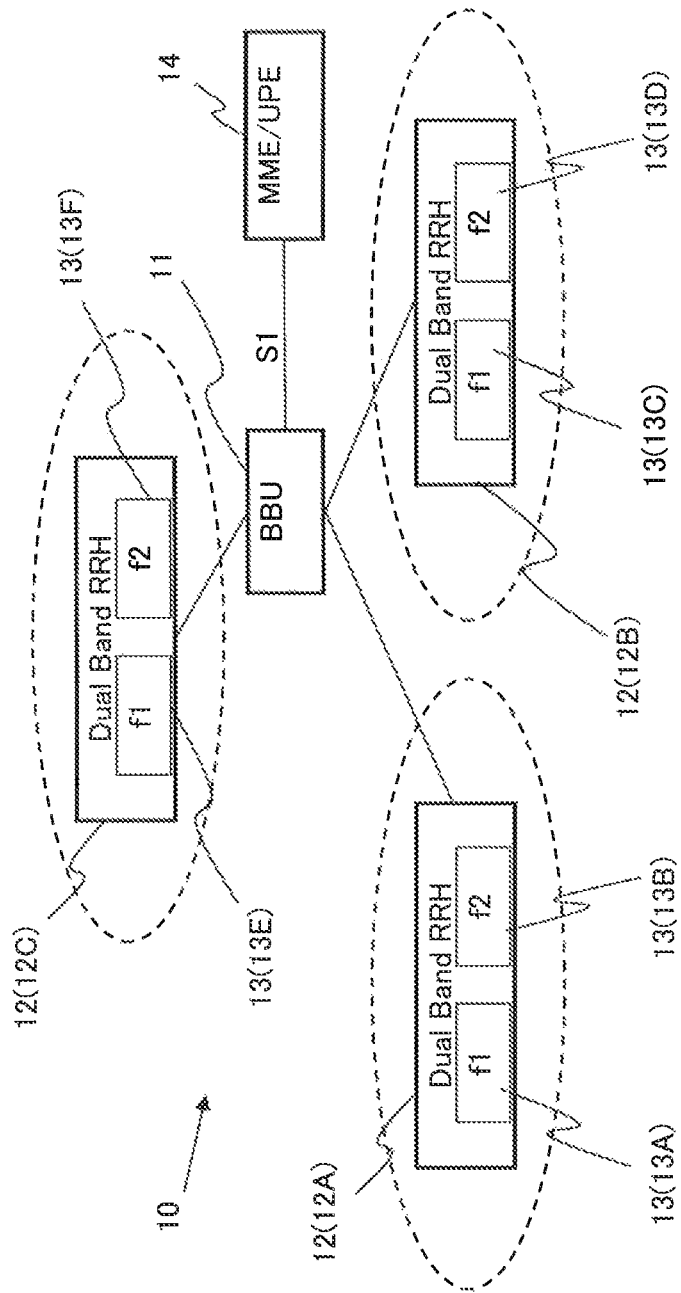
FIG. 1 illustrates an example of a system configuration including a base station apparatus.

FIG. 1 illustrates an example of a system configuration including a base station apparatus according to the present embodiment. In FIG. 1, the base station apparatus (referred to as an eNode B) 10 includes a BBU 11, and plural dual band RRHs (referred to as DB-RRHs, hereinafter) 12 connected to the BBU 11. The DB-RRH 12 is a wireless device including two RRHs 13 associated with each other and using different frequency bands in order to correspond to dual bands. The two RRHs may forms a dual bands radio apparatus as a pair associated with each other. For example, the DB-RRH 13 may be a wireless apparatus including a single housing to accommodate the two RRHs 13. The DB-RRH 12 may also be a wireless apparatus including one RRH 13 directly connected to a BBU 11 and another RRH 13 indirectly connected to the BBU 11 via the one RRH 13. Thus, the DB-RRH 12 may be a wireless apparatus including two RRHs 13 which are multistage connected to the BBU 11. In FIG. 1, three DB-RRHs 12 (DB-RRH 12A, DB-RRH 12B, and DB-RRH 12C) are exemplified.

The DB-RRH 12A includes a first RRH 13 (RRH 13A) using a first frequency band (frequency band f1), and a second RRH 13 (RRH 13B) using a second frequency band (frequency band f2). The DB-RRH 12B has an identical configuration to that of the DB-RRH 12A, and includes a first RRH 13 (RRH 13C) using the first frequency band (frequency band f1), and a second RRH 13 (RRH 13D) using the second frequency band (frequency band f2). The DB-RRH 12C also has an identical configuration to that of the DB-RRH 12A, and includes a first RRH 13 (RRH 13E) using the first frequency band (frequency band f1), and a second RRH 13 (RRH 13F) using the second frequency band (frequency band f2).

The BBU 11 is an example of the radio control apparatus. In the DB-RRHs 12, the RRHs 13 (that are RRH 13A, RRH 13C, and RRH 13E) using the first frequency band f1 are an example of the first radio device, and the RRHs 13 (that are RRH 13B, RRH 13D, and RRH 13F) using the second frequency band f2 are an example of the second radio device. The BBU 11 is connected to a mobile management entity/user plane entity (MME/UPE) 14 that is a host apparatus of the base station apparatus 10 through an S1 interface. The MME/UPE 14 is a core network apparatus disposed in a core network, and carries out positional registration of mobile terminals, and connection processing between the core network and an external network (such as IP network). The S1 interface is disposed on a transmission path that connects the BBU 11 with the MME/UPE 14. The transmission path is a local area network (LAN) such as the Ethernet.

The two RRHs 13 included in each DB-RRH 12 generate two overlaid cells (sectors) whose frequency bands are different from each other. In the present specification, the "cell" is a concept involving the "sector".

Figure 2:
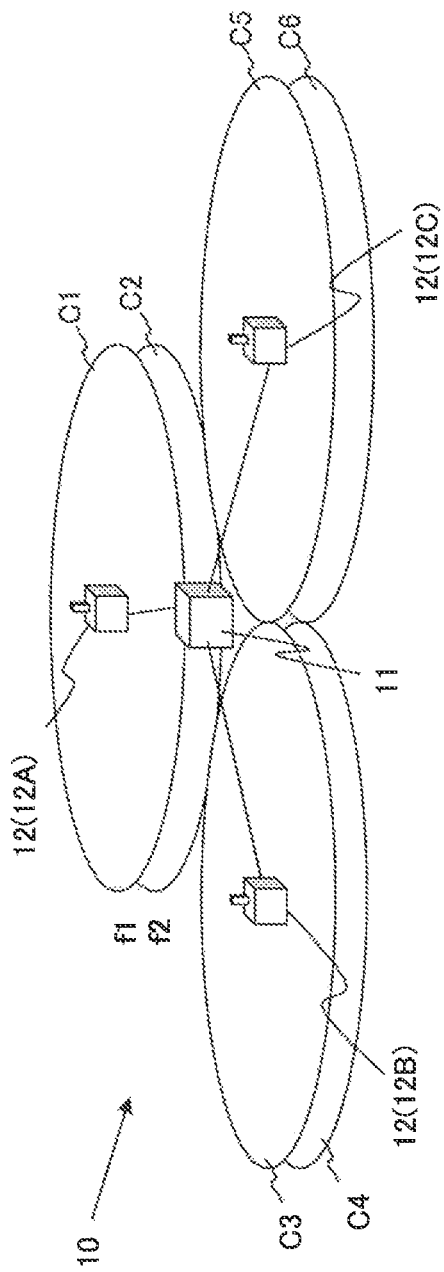
FIG. 2 illustrates cells formed by the base station apparatus.

FIG. 2 illustrates the cells formed (generated) by the base station apparatus 10. In the example illustrated in FIG. 2, in the DB-RRH 12A, a cell C1 in which the frequency band f1 is used is formed by the RRH 13A, and a cell C2 in which the frequency band f2 is used is formed by the RRH 13B so as to be overlaid with the cell C1. Similarly, in the DB-RRH 12B, a cell C3 in which the frequency band f1 is used is formed by the RRH 13C, and a cell C4 in which the frequency band f2 is used is formed by the RRH 13D. Similarly, in the DB-RRH 12C, a cell C5 in which the frequency band f1 is used is formed by the RRH 13E, and a cell C6 in which the frequency band f2 is used is formed by the RRH 13F. In the case of carrying out the carrier aggregation, a pair of the cells C1 and C2, a pair of the cells C3 and C4, and a pair of the cells C5 and C6 are respectively handled as a single cell, but the cells of each pair are both described as separate cells for convenience of explanation in the present specification.

The cells C3 and C4, and the cells C5 and C6 are overlaid with each other, respectively. These cells have overlaid regions between two cells such that the cells C3 and C5 function as adjacent cells (peripheral (surrounding) cells) for the cell C1, and the cells C4 and C6 function as adjacent cells for the cell C2. In the present specification, the term "overlay" includes a meaning of "overlap".

Each of the mobile terminals located in the cells C1 to C6 is connected to the base station apparatus 10 by connecting to an RRH 13 that forms a cell. A mobile terminal that is connected to the base station apparatus 10 may communicate with terminals connected to the Internet Protocol (IP) network and the Internet through the core network, or with other mobile terminals located in the above cells. The number of the DB-RRHs 12 (RRHs) connected to the BBU 11 may be selected from any one of integers equal to or greater than two as far as the BBU 11 may accept the selected number of the DB-RRHs 12. The RRHs that are connected to the BBU 11, and that form the adjacent cells are not limited to the DB-RRHs, and general RRHs may also be applicable.

<Transmission Power Control Method in Base Station Apparatus>

In the configuration of the base station apparatus 10 illustrated in FIG. 1 and FIG. 2, it is assumed that failure (defect) occurs in the RRH 13A forming the cell C1, for example. It is assumed that failure occurs in an RF amplifier included in the RRH 13A, for example.

In this case, a radio link between each mobile terminal located in the cell C1 and the RRH 13A becomes disconnected. Each mobile terminal disconnected from the cell C1 executes cell search so as to attempt to connect to another cell. When plural cells are found through the cell search, one of the cells that may secure desired radio quality is selected as an access point.

As a result of the cell search, not only the cell C2 but also the adjacent cells C3 to C6 may be found. In this case, based on a predetermined selecting criteria (such as radio field intensity), one cell is determined from two or more cells as an access point.

Depending on the measurement result of the radio field intensity, most of the mobile terminals disconnected from the cell C1 may determine the cell C2 as their access points. In this case, connection requests transmitted from these mobile terminals are concentrated on the RRH 13B. Consequently, congestion of processing (random access processing) for being connected to the cell C2 occurs on the BBU 11, which may result in an error due to overload on the BBU 11.

Figure 3:
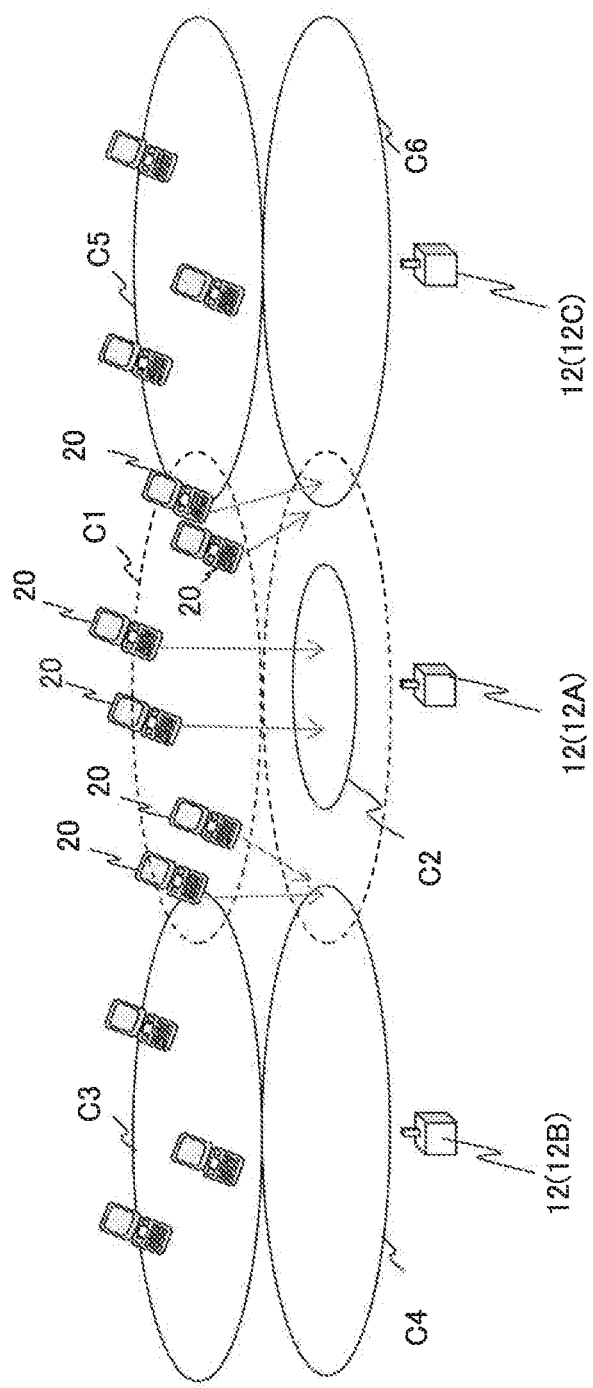
FIG. 3 is a drawing explaining an operation of the embodiment.

In the present embodiment, as illustrated in FIG. 3, when the RRH 13A of the DB-RRH 12A forming the cell C1 (cell C1 is indicated by a broken line in FIG. 3) has failure, transmission power control related to the RRH 13B in the DB-RRH 12A is performed, namely, transmission power is reduced. The size (cell radius) of the cell C2 becomes decreased due to reduction in the transmission power. When the size of the cell C2 becomes decreased, each mobile terminal 20 of the cell C1 located in a boundary to an adjacent cell selects this adjacent cell (any one of the cells C3 to C6) as an access point for reconnection. It is expected that load of signal processing (random access processing, etc.) pertinent to connection to the cell C2 becomes reduced compared to the case of having no transmission power control. In other word, reduction in load on the BBU 11 is attained.

<<Sequence Pertinent to Mobile Terminals that May Selectively Use Plural Frequency Bands>>

Figure 4A:
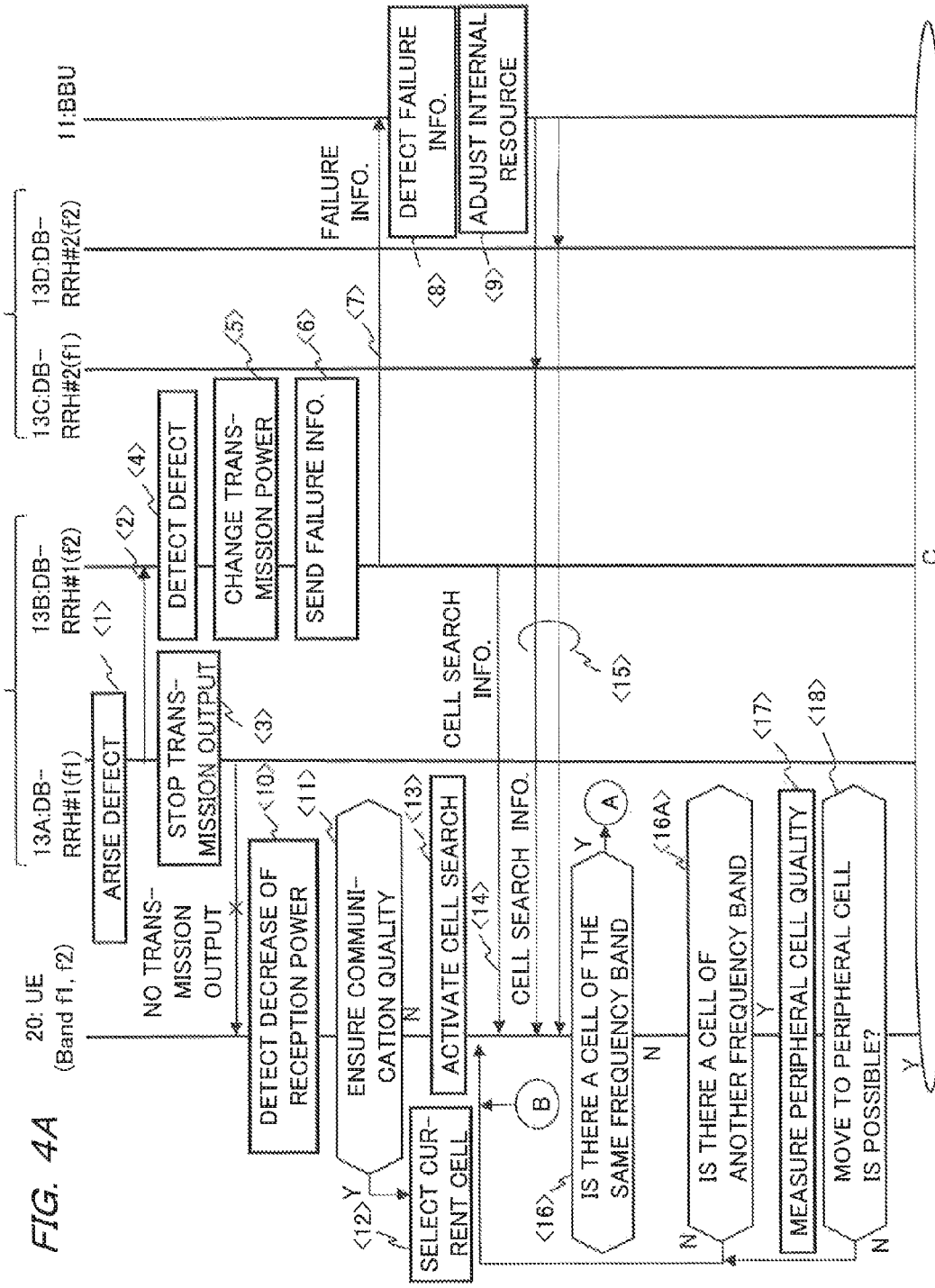

FIG. 4A, FIG. 4B and FIG. 5 illustrate sequences of transmission power control on a mobile terminal (UE: user equipment) 20 that may selectively use plural frequency bands (e.g. frequency bands f1 and f2). In FIG. 4A, it is assumed that the mobile terminal 20 uses the frequency band f1, and is connected to the cell C1.

When a defect (failure) occurs in the RRH 13A (DB-RRH#1 (Band f1)) in the DB-RRH 12A forming the cell C1 (FIG. 4A, <1>), a failure notification is sent to the RRH 13B (DB-RRH#1 (Band f2)) in the DB-RRH 12A (FIG. 4A, <2>). Thereafter, the RRH 13A stops transmission output (transmission power) for the cell C1 (FIG. 4A, <3>). Note that transmission output may be stopped without intension because of failure in some cases.

One of the two RRHs 13 (e.g. RRH 13A) included in each DB-RRH 12 monitors the other RRH 13 (RRH 13B) as its counterpart, and the other RRH 13B monitors the one RRH 13A as its counterpart for mutual monitoring. Through this monitoring, the failure notification transmitted from the RRH 13A of the counterpart is detected. Thereby, the RRH 13B detects the failure of the RRH 13A (FIG. 4A, <4>).

The RRH 13B that has detected the failure changes the transmission power (FIG. 4A, <5>). Specifically, the RRH 13B reduces the transmission power. Consequently, the size of the cell C2 becomes decreased (its cell radius becomes narrower). FIG. 6 is a drawing explaining change in transmission power.

FIG. 6 illustrates a graph regarding a relation among a distance from the RRH, radio quality, and a threshold value for securing desired radio quality (communication quality). In this graph, a maximum length from the RRH relative to the threshold value is a distance A before reduction in transmission power is carried out. To the contrary, a maximum length from the RRH relative to the threshold value is a distance B after reduction in transmission power is carried out.

The mobile terminal 20, which has a distance to the RRH 13B forming the cell C2 located between the distance A and the distance B, is not able to find the cell C2 through the cell search, or the mobile terminal 20 has radio quality less than the threshold value when the mobile terminal 20 is connected to the cell C2. Accordingly, the mobile terminal 20 located between the distance A and the distance B determines a cell other than the cell C2 as access points for reconnection. Accordingly, it is possible to reduce the number of connection requests for connecting to the cell C2 caused by a stop of transmission output to the cell C1.

As an index of the radio quality compared to the threshold value, at least one of RSSI (received signal strength indication), SIR (signal to interference ratio), and propagation loss may be applicable, for example.

With reference to FIG. 4A again, the RRH 13B transmits failure information regarding the RRH 13A to the BBU 11 (FIG. 4A, <6> and <7>). The RRH that has received the failure notification (the other RRH having no failure) transmits the failure information regarding the counterpart RRH to the BBU 11, thereby securely transmitting the failure information of the BBU 11.

When the failure information is detected (FIG. 4A, <8>), the BBU 11 may carry out the following processing as selective processing. Specifically, the BBU 11 adjusts internal resources of the BBU 11 (FIG. 4A, <9>).

When the transmission output is stopped at the RRH 13A, internal resources for signal processing to be transmitted or received by the RRH 13A (internal resources for the cell C1) are substantially unused. Hence, the BBU 11 may allocate the internal resources for the cell C1 to at least one of the other cells C2 to C6. The internal resources may be adjusted (distributed), for example, depending on the load state of the signal processing on each of the cells C2 to C6. When it is apparent that reduction in size of the cell C2 securely reduces the number of the mobile terminals connected to the cell C2, a part of the internal resources for the cell C2 may also be allocated to the other cells. This enhances effective usage of the internal resources.

When the BBU 11 changes the allocation of the internal resources, the BBU 11 stores the allocation state thereof before the change, and restores the allocation state of the internal resources to the state before the change in accordance with restoration of the RRH 13A from the failure state.

Each mobile terminal (UE: user equipment) 20, which is located in the cell C1, and has a distance to the RRH 13B located between the distance A and the distance B of FIG. 5, is not able to receive radio waves from the RRH 13A because the transmission output from the RRH 13A is stopped. Hence, each mobile terminal 20 detects reduction in received power (FIG. 4A, <10>). The mobile terminal 20 then determines whether or not desired communication quality (radio quality) is secured (FIG. 4A, <11>).

This means that each mobile terminal 20 determines whether or not the index value of the measured radio quality is less than a predetermined threshold value stored in advance. When this index value is not less than the threshold value (Y in FIG. 4A, <11>), the mobile terminal 20 maintains the connection to the cell currently used (current cell) (FIG. 4A, <12>). Note that in the sequence of FIG. 4A, the radio waves from the cell C1 is not able to be received, so that the radio quality is less than the threshold value (N in FIG. 4A, <11>).

When the radio quality is less than the threshold value, the mobile terminal 20 executes disconnection processing of disconnecting from the cell C1, and activates the cell search processing (FIG. 4A, <13>). In FIG. 4A, through this cell search, cell search information is received from the RRH 13B (cell C2) (FIG. 4A, <14>). In addition, cell search information is also received from the RRH 13C and the RRH 13D (cell C3 and cell C4) (FIG. 4A, <15>).

With reference to frequency band information included in each cell search information, the mobile terminal 20 determines whether or not there is any cell having a frequency band identical to the frequency band (frequency band f1) used by the mobile terminal 20 (FIG. 4A, <16>). When there is any cell having the identical frequency band (Y in FIG. 4A, <16>), the processing proceeds to <29> of FIG. 5. For example, when the mobile terminal 20 may receive the cell search information from the RRH 13C, the processing proceeds to <29>. To the contrary, when there is no identical frequency band (N in FIG. 4A, <16>), the mobile terminal 20 determines whether or not there is any other cell having a frequency band different from the frequency band f1 (frequency f2) (FIG. 4A, <16A>). At this time, when there is no cell having a different frequency band (frequency band f2) (N in FIG. 4A, <16A>), the cell search is continued (in a state of waiting for radio waves from a cell).

Based on the cell search information from the RRH 13B and the RRH 13D, when the mobile terminal 20 may determine that there are any cells having a different frequency band f2 (Y in FIG. 4A, <16A>), the mobile terminal 20 executes quality measurement processing on these cells (FIG. 4A, <17>). Specifically, the mobile terminal 20 measures the radio quality indexes of the radio waves from the RRH 13B (cell C3) and the RRH 13D (cell C4). Subsequently, the mobile terminal 20 determines whether or not there are any cells to which the mobile terminal 20 may move (may connect) (FIG. 4A, <18>).

As aforementioned, when the mobile terminal 20 is located between the distance A and the distance B, it is difficult to secure the desirable radio quality (radio quality becomes less than the threshold value), and thus it is avoided that the cell C2 of the RRH 13B is selected as an access point for reconnection. When the radio waves from the RRH 13D secure the desired radio quality (not less than the threshold value), the cell C4 of the RRH 13D that is an adjacent cell (peripheral cell) is selected as an access point. When the radio qualities of the radio waves from the RRH 13B and the RRH 13D are both not more than the threshold value, the cell search is continued.

In the example of FIG. 4A and FIG. 4B, the radio quality of the radio waves from the RRH 13D becomes not less than the threshold value, so that it is determined that the mobile terminal 20 may move to the cell C4, for example. The mobile terminal 20 receives notification information transmitted from the BBU 11 through the RRH 13D (FIG. 4B, <19>), and then starts the random access processing that is processing of connecting to the cell C4 (FIG. 4B, <20>).

The mobile terminal 20 transmits a random access request message as the connection request for connecting to the cell C4 (FIG. 4B, <21>). The random access request message is received by the BBU 11 through the RRH 13D (FIG. 4B, <22> and <23>). The reception of the random access request message triggers execution of a random access procedure, which is a processing procedure carried out between the BBU 11 and the MME/UPE 14 for the sake of establishing a radio link between the mobile terminal 20 and the BBU 11. The BBU 11 transmits a random access response message (FIG. 4B, <24>), and the mobile terminal 20 receives this message (FIG. 4B, <25>), thereby establishing the radio link between the BBU 11 and the mobile terminal 20 (FIG. 4B, <26> and <27>).

When there is any peripheral cell having the identical frequency band (Y in FIG. 4A, <16>), the mobile terminal 20 carries out the quality measurement processing of this peripheral cell (FIG. 5, <29>). Specifically, the mobile terminal 20 measures the radio quality index value of the radio waves transmitted from the RRH 13C (cell C3).

Subsequently, the mobile terminal 20 determines whether or not it is possible to move (connect) to the peripheral cell (cell C3) (FIG. 5, <30>). For example, when the radio quality index value is more than the threshold value, the mobile terminal 20 determines that it is possible to move (connect) to the peripheral cell. When the radio quality index value is less than the threshold value, the mobile terminal 20 continues the cell search.

In the example of FIG. 5, it is assumed that the radio quality of the radio waves from the cell C3 becomes more than the threshold value, and it is determined that the mobile terminal 20 may move to the cell C3, for example. In this case, the mobile terminal 20 receives the notification information transmitted from the BBU 11 through the RRH 13C (FIG. 5, <31>), and starts the random access processing that is the connection processing of connecting to the cell C3 (FIG. 5, <32>).

The mobile terminal 20 transmits the random access request message as the connection request for connecting to the cell C3 (FIG. 5, <33>). The random access request message is received by the BBU 11 through the RRH 13C (FIG. 5, <34> and <35>). The receipt of the random access request triggers execution of the random access procedure between the BBU 11 and the MME/UPE 14. The BBU 11 then transmits the random access response message (FIG. 5, <36>), and the mobile terminal 20 receives this message (FIG. 5, <37>), thereby establishing the link connecting between the BBU 11 and the mobile terminal 20 through the RRH 13C (FIG. 5, <38> and <39>).

In the above example, the cell search regarding the frequency band identical to the frequency band f1 that is used before the disconnection is previously executed. The cell search regarding the frequency band f2 different from the frequency band f1 may be previously executed, instead. In this case, when the radio quality of the radio waves from the RRH 13D is more than the threshold value, the connection processing of connecting to the cell C4 is carried out. On the other hand, when the radio quality of the radio waves from the RRH 13D is less than the threshold value, the cell search regarding the frequency band f1 is carried out, and connection to the cell C3 or to the cell C5 is attempted depending on the location of the mobile terminal 20.

<<Sequence in the Case of Carrier Aggregation Support Terminals>>

The mobile terminals located in the cell C1 include not only mobile terminals that may selectively use plural frequency bands as described above, but also mobile terminals that may support the carrier aggregation framework using plural frequency bands as a single band (carrier aggregation support terminals). These carrier aggregation support terminals may perform communication through the carrier aggregation using the frequency bands f1 and f2 (cell C1 and cell C2, cell C3 and cell C4, cell C5 and cell C6). In these carrier aggregation support terminals, when their links to the frequency band storing a control channel (e.g. frequency band f1) become disconnected, these carrier aggregation terminals execute reconnection to cells using the different frequency band f2 from the frequency band f1 of the disconnected link.

Consequently, when the cell C2 is selected from plural cells having the frequency band f2, this may cause congestion of connection requests to the cell C2. For this reason, even in the carrier aggregation support terminals, in order to prompt connection to adjacent cells (peripheral cells), the same processing as that in the sequence of FIG. 4A and FIG. 4B is executed by the base station apparatus 10.

Figure 7A:
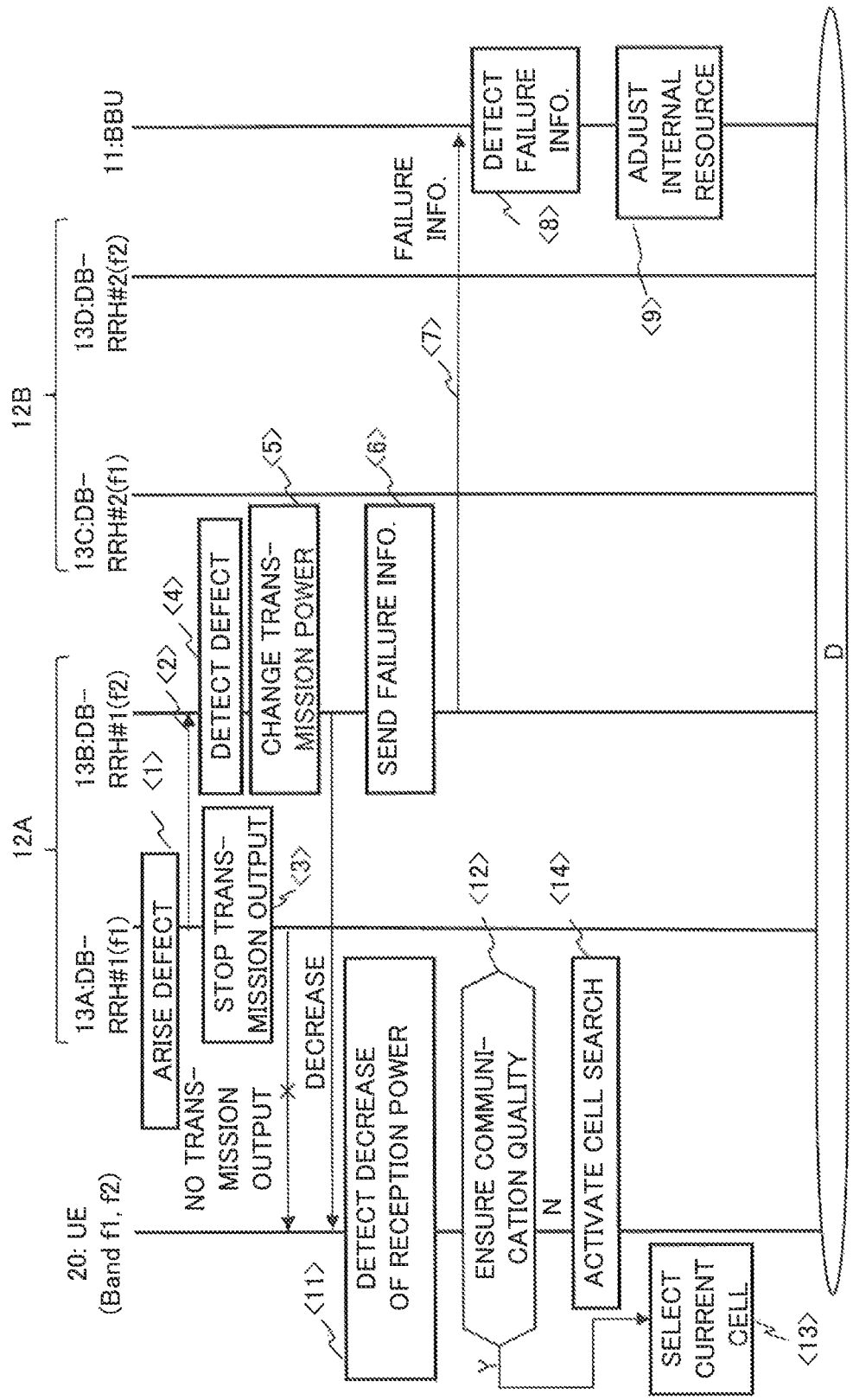
FIGS. 7A and 7B illustrate an example of a sequence regarding a mobile terminal that is a carrier aggregation support terminal.
Figure 7B:
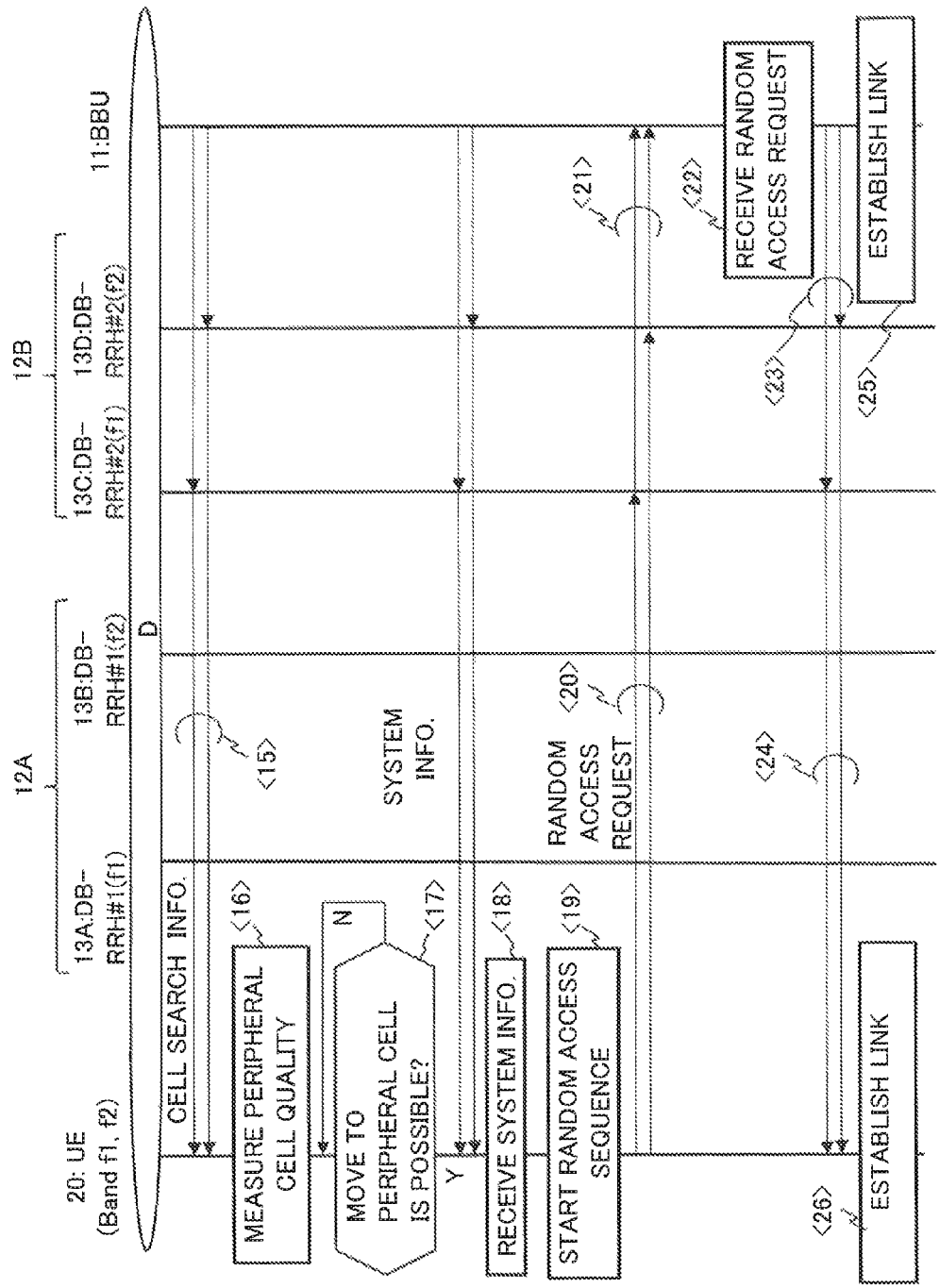

FIG. 7A and FIG. 7B illustrate an example of a sequence regarding each mobile terminal 20A that is a carrier aggregation support terminal. It is assumed that the mobile terminal 20A is connected to the cell C1 and the cell C2, and carries out communication through the carrier aggregation using the frequency band f1 and the frequency band f2. In addition, it is assumed that a distance between the mobile terminal 20A and the RRH 13B is located between the distance A and the distance B illustrated in FIG. 6.

Description on the operation of the base station apparatus 10 (RRH 13A, RRH 13B and BBU 11) in FIG. 7A (FIG. 7A, <1> to <9>) is similar to the operation of <1> to <9> in FIG. 4A, and thus description thereof will be omitted.

The mobile terminal 20A detects reduction of the received power of the radio waves (disconnection of transmission output) from the cell C1 when the transmission output from the RRH 13A is stopped, and the mobile terminal 20A executes disconnection processing of disconnecting from the cell C1 (FIG. 7A, <10>). Subsequently, the mobile terminal 20A detects reduction in the received power from the RRH 13B because the transmission power of the RRH 13B is reduced (FIG. 7A, <11>).

The mobile terminal 20A then determines whether or not the communication quality is secured (FIG. 7A, <12>). Specifically, the mobile terminal 20A determines whether or not the index value of the radio quality measured for the RRH 13B is less than the threshold value. When the index value is not less than the threshold value (Y in FIG. 7A, <12>), the mobile terminal 20A maintains the connection to the cell currently used (current cell) (FIG. 7A, <13>). In the sequence of FIG. 7A, however, the radio quality becomes less than the threshold value due to the reduction in transmission output (N in FIG. 7A, <12>).

Hence, the mobile terminal 20A activates the cell search processing regarding adjacent cells (peripheral cells) (FIG. 7A, <14>). Through the cell search, the mobile terminal 20A receives cell search information from the RRH 13C and the RRH 13D (cell C3 and cell C4) (FIG. 7B, <15>).

The mobile terminal 20A measures each index value of the radio qualities of the radio waves transmitted from the RRH 13C and the RRH 13D using information regarding the cell C3 and the cell C4 included in each cell search information (FIG. 7B, <16>). Subsequently, the mobile terminal 20A determines whether or not the mobile terminal 20A may move (connect) to the cell C3 and the cell C4 based on the measurement result of the index value of each radio quality (FIG. 7B, <17>). This determination is carried out by using comparison between each measured index value and the threshold value, as described above. At this time, when the radio qualities of the cell C3 and the cell C4 are less than the threshold value (N in FIG. 7B, <17>, the cell search is continued.

To the contrary, when the radio qualities of the cell C3 and the cell C4 are both not less than the threshold value (Y in FIG. 7B, <17>), the mobile terminal 20A receives the respective notification information regarding the cell C3 and the cell C4, which is transmitted from the BBU 11 through the RRH 13C and the RRH 13D (FIG. 7B, <18>). The mobile terminal 20A then starts the random access processing that is the connection processing of connecting to the cell C3 and to the cell C4 (FIG. 7B, <19>).

The mobile terminal 20A transmits the respective random access request messages to the cell C3 and to the cell C4 (FIG. 7B, <20>). The BBU 11 receives the random access request message regarding the cell C3 through the RRH 13C, and receives the random access request message regarding the cell C4 through the RRH 13D (FIG. 7B, <21>).

Receipt of the random access request triggers the random access procedure, which is processing procedure for establishing two radio links regarding the cell C3 and the cell C4 between the mobile terminal 20 and the BBU 11, to be executed on BBU 11 and on the MME/UPE 14, respectively.

The BBU 11 then transmits random access response messages regarding the cell C3 and the cell C4 (FIG. 7B, <23>), and the mobile terminal 20A receives these messages (FIG. 7B, <24>). In this manner, the two radio links between the BBU 11 and the mobile terminal 20A are established (FIG. 7B, <25> and FIG. 7B, <26>). The mobile terminal 20A may carry out communication through the carrier aggregation via the connection to the cell C3 and to the cell C4.

When the carrier aggregation support terminal (mobile terminal 20A) is located at a position having the radio quality less than the threshold value due to the reduction in size of the cell C2, stop of the transmission output from the RRH 13A triggers forced reconnection to an adjacent cell. Accordingly, it is possible to reduce the number of the connection requests for connecting to the cell C2, thereby reducing load on the BBU 11.

It may be determined in some cases that the mobile terminal 20A cannot move to the adjacent cell in the processing of <17> in FIG. 7B depending on the location of the mobile terminal 20A. In this case, the mobile terminal 20A is in a state that is not able to connect to another cell. Even in this case, however, it is possible to prevent increase in processing load regarding the cell C2 on the BBU 11, thereby preventing processing congestion, and overload on the BBU 11.

As aforementioned, existing mobile terminals that may selectively use plural frequency bands, and existing carrier aggregation support terminals may be applicable as mobile terminals in the present embodiment.

In the sequences illustrated in FIG. 4A, FIG. 4B, FIG. 5, FIG. 7A and FIG. 7B, which have focused on the cell C1 (RRH 13A), when the cell C2 (RRH 13B) has failure, reduction in transmission output of the cell C1 (RRH 13A) is executed so as to reduce the cell radius of the cell C1. Both the DB-RRH 12B and the DB-RRH 12C may carry out similar operation to that of the DB-RRH 12A illustrated in FIG. 4A, FIG. 4B, FIG. 5, FIG. 7A and FIG. 7B.

In the sequences illustrated in FIG. 4A, FIG. 4B, FIG. 5, FIG. 7A and FIG. 7B, when a mobile terminal that may use only a single frequency band (frequency band f1) is located in the cell C1, stop of the transmission output regarding the cell C1 triggers the mobile terminal to execute the cell search regarding adjacent cells in which the identical frequency band f1 is used, and when any adjacent cell that satisfies the radio quality is found, the mobile terminal connects to this adjacent cell.

<Configuration of BBU>

Figure 9:
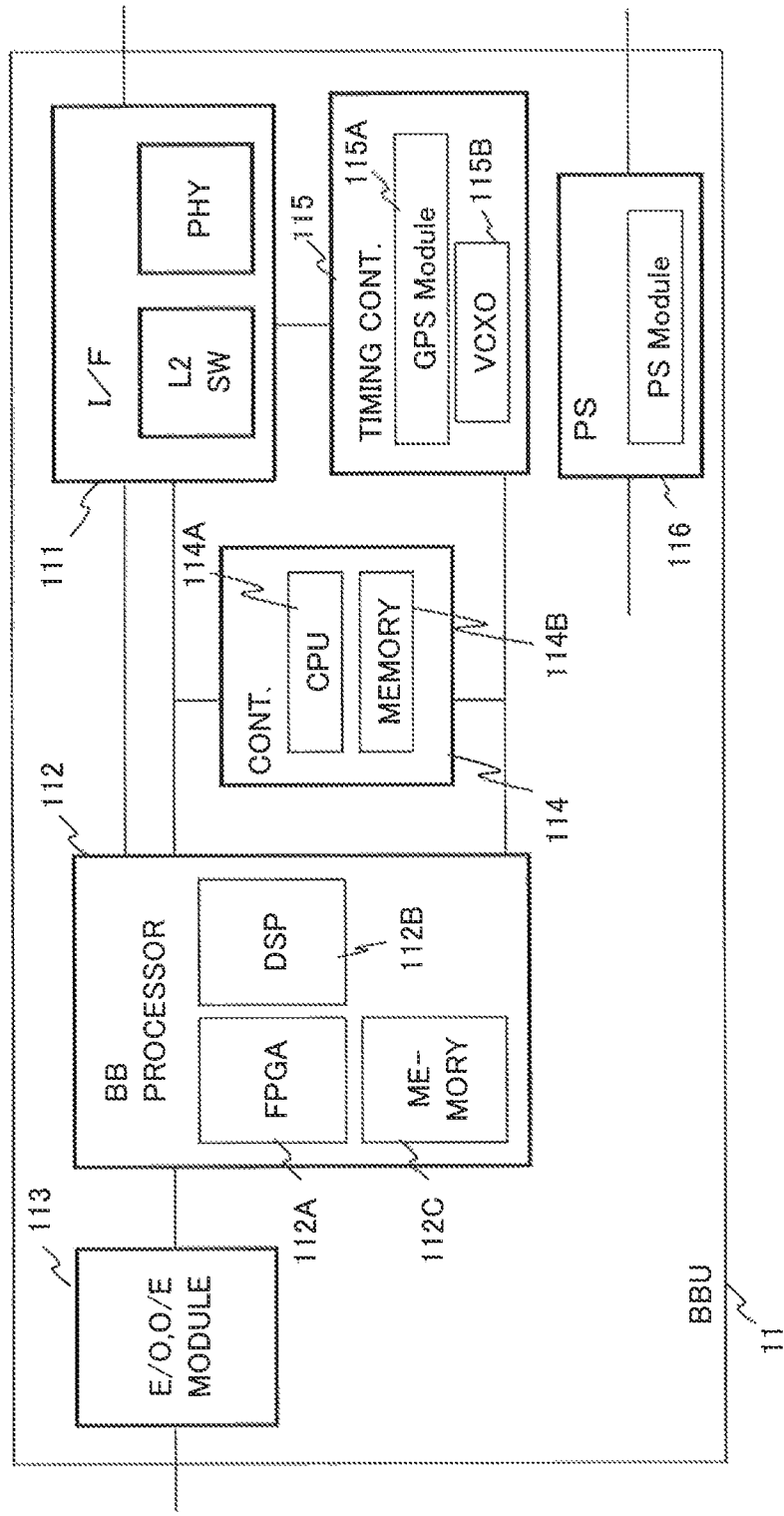
FIG. 9 illustrates an example of a hardware configuration of a BBU.

An example of the configuration of the BBU 11 will be described as follows. FIG. 8 illustrates an example of a functional block configuration of the BBU 11, and FIG. 9 illustrates an example of a hardware configuration of the BBU 11.

In FIG. 8, the BBU 11 includes a transmission path interface 111, a baseband (BB) processor 112 connected to the transmission path interface 111, and an electric-optic (E/O) converting module 113 connected to the baseband processor 112. The BBU 11 also includes a timing controller 115 connected to the transmission path interface 111, and a controller 114 connected to the transmission path interface 111, the baseband processor 112, and the timing controller 115. The BBU 111 further includes a power supply (PS) 116.

The transmission path interface 111 carries out line terminating processing for the S1 interface (interface to MME/UPE 14) and an X2 interface (interface to another base station), and protocol processing for an IP layer. A transmission path such as LAN (e.g. Ethernet) is connected to the transmission path interface 111 so as to transmit and receive IP packets.

The baseband processor 112 carries out conversion (modulation and demodulation) processing of IP packets transmitted or received on the transmission path interface 111, and of OFDM (orthogonal frequency division multiplexing) signals transmitted or received on a radio link between each RRH and each mobile terminal.

Specifically, the baseband processor 112 carries out protocol processing of each layer such as a radio link control (RLC) layer, a packet data convergence protocol (PDCP) layer, a media access control layer, and a physical layer (PHY). The baseband processor 112 also carries out multi-level modulation and OFDM processing for modulating IP packets into OFDM signals (baseband signals: also referred to as IQ signals).

The baseband processor 112 also carries out processing regarding an interface protocol between the BBU and each RRH. As an interface between the BBU and each RRH, a CPRI (common public radio interface) may be applicable. The baseband processor 112 executes processing regarding the CPRI protocol. For example, the baseband processor 112 carries out processing of mapping the baseband signals as the IQ signals on the CPRI interface so as to generate CPRI interface signals, and processing of converting the CPRI interface signals to the baseband signals.

In addition, the baseband processor 112 carries out signal processing on the physical layer (PHY) interface, such as MIMO (multiple input multiple output) processing. Each of the above processing in the baseband processor 112 is executed in units of RRH (cell).

The E/O converting module 113 stores optical lines (optical fibers) connected to the DB-RRHs 12. The E/O converting module 113 carries out processing of converting the CPRI interface signals that are the baseband signals (OFDM signals) mapped as the IQ signals on the CPRI interface into optical signals (E/O conversion), and transmitting the converted optical signals to the DB-RRHs 12, and processing of converting optical signals received from the optical fibers into the CPRI interface signals (O/E conversion).

The controller 114 carries out call control processing, and monitoring control processing, such as collecting in-apparatus failure information. As part of the monitoring control processing, the controller 114 carries out allocation processing of allocating internal resources for the signal processing executed on the baseband processor 112.

Based on clock signals extracted by the transmission path interface 111, or based on reference timing signals generated from GPS (global positioning system) signals, the timing controller 115 generates the clock signals to be distributed to the transmission path interface 111, the baseband processor 112, the E/O converting module 113, and the controller 114. The power supply 116 supplies power for operation to the transmission path interface 111, the baseband processor 112, the E/O converting module 113, and the controller 114.

As illustrated in FIG. 9, the transmission path interface 111 illustrated in FIG. 8 may be embodied by using electronic circuits (interface circuits) that embody a storing function 111A of PHY and LAN, and a layer 2 switch (L2SW) function 111B, for example. An existing network card (network interface card: NIC) may be applicable as the transmission path interface, for example.

The baseband processor 112 may be constituted by an FPGA (field programmable gate array) 112A, a DSP (digital signal processor) 112B, and a memory 112C. The memory 112C may include a volatile storage medium such as RAM and DRAM, and a nonvolatile storage medium such as ROM and EEPROM. The memory 112C stores various programs to be executed by an FPGA 112A and a DSP 112B, and data to be used when the various programs are executed. The memory 112C is used as a working area of the FPGA 112A and the DSP 112B.

The E/O converting module 113 is embodied by using an electric-optic conversion device serving as an electric-optic converting module (E/O module) and an optic-electric converting (O/E) module. The present embodiment is described by using an example of an optical interface (CPRI) used between the BBU and each RRH, but electric signals may be transmitted and received between the BBU and each RRH, instead.

The controller 114 is embodied by a central processing unit (CPU) 114A and a memory 114B. The memory 114B includes a volatile storage medium, and a nonvolatile storage medium, as similar to the memory 112C, and may be used as a storage area for storing various programs to be executed by the CPU 114A, and data to be used when the various programs are executed, and as also a working area of the CPU 114A. The CPU 114A executes the programs stored in the memory 114B so as to embody the call control function, and an operation administration and maintenance function (OAM). As part of the operation administration and maintenance function, adjusting processing for the aforementioned internal resources is executed.

The timing controller 115 is embodied by applying a GPS module 115A that is a GPS receiver, and an oscillator (e.g. VCXO) 115B. The power supply 116 is embodied by using a power supply (PS) module (power supply device).

The aforementioned DSP 112B and CPU 114A are an example of a processor, and memory 112C and the memory 114B are an example of a storage device. Multi-purpose hardware may be applicable to various hardware used for constituting the above BBU 11. Note that the baseband processor 112 and the controller 114 may be embodied by using dedicated hardware such as an ASIC (application specific integrated circuit), or by combination of dedicated hardware and multipurpose hardware.

User data in the BBU 11 is generally processed as follows. User data in a down link is received as IP packets on the transmission path interface 111. The IP packets are forwarded from the transmission path interface 111 to the baseband processor 112.

The baseband processor 112 converts the IP packets into the OFDM signals (baseband signals) through the multi-level modulation processing or the OFDM processing. The baseband signals are mapped as the IQ signals on the CPRI interface through the CPRI processing. The CPRI interface signals generated through the CPRI processing are converted into optical signals on the E/O converting module 113, and are transmitted to the DB-RRH 12 of destination through the optical fiber.

Meanwhile, the E/O converting module 113 converts the optical signals received from each RRH 13 through the optical fiber into the baseband signals through the CPRI processing, and transmits the converted signals to the baseband processor 112. The baseband processor 112 converts the baseband signals into the IP packets, and transmits the IP packets to the transmission path interface 111, and the transmission path interface then forwards these IP packets to the transmission path.

The controller 114 transmits the IP packets including data for monitoring control (including OAM) (any data other than user data is referred to as "control data" in the present specification) to the baseband processor 112. The baseband processor 112 converts the IP packets into the baseband signals, and obtains the CPRI interface signals from the baseband signals through the CPRI processing. The E/O converting module 113 converts the CPRI interface signals into the optical signals, and then transmits the optical signals to the RRH 13 of destination. The control data transmitted to the RRH 13 may include the cell search information, the notification information, and the random access response message, as illustrated in the sequences of FIG. 4A, FIG. 4B, FIG. 7A and FIG. 7B.

The optical signals including the control data transmitted from RRH 13 are received on the E/O converting module 113, and are then converted into the baseband signals. The baseband signals are converted into the IP packets on the baseband processor 112, and are then supplied to the controller 114. In this manner, the controller 114 may receive the control data. The control data transmitted from the RRH 13 includes the failure information, and the random access request message, as illustrated in the sequences of FIG. 4A, FIG. 4B, FIG. 7A and FIG. 7B.

<Configuration of DB-RRH>

Figure 10:
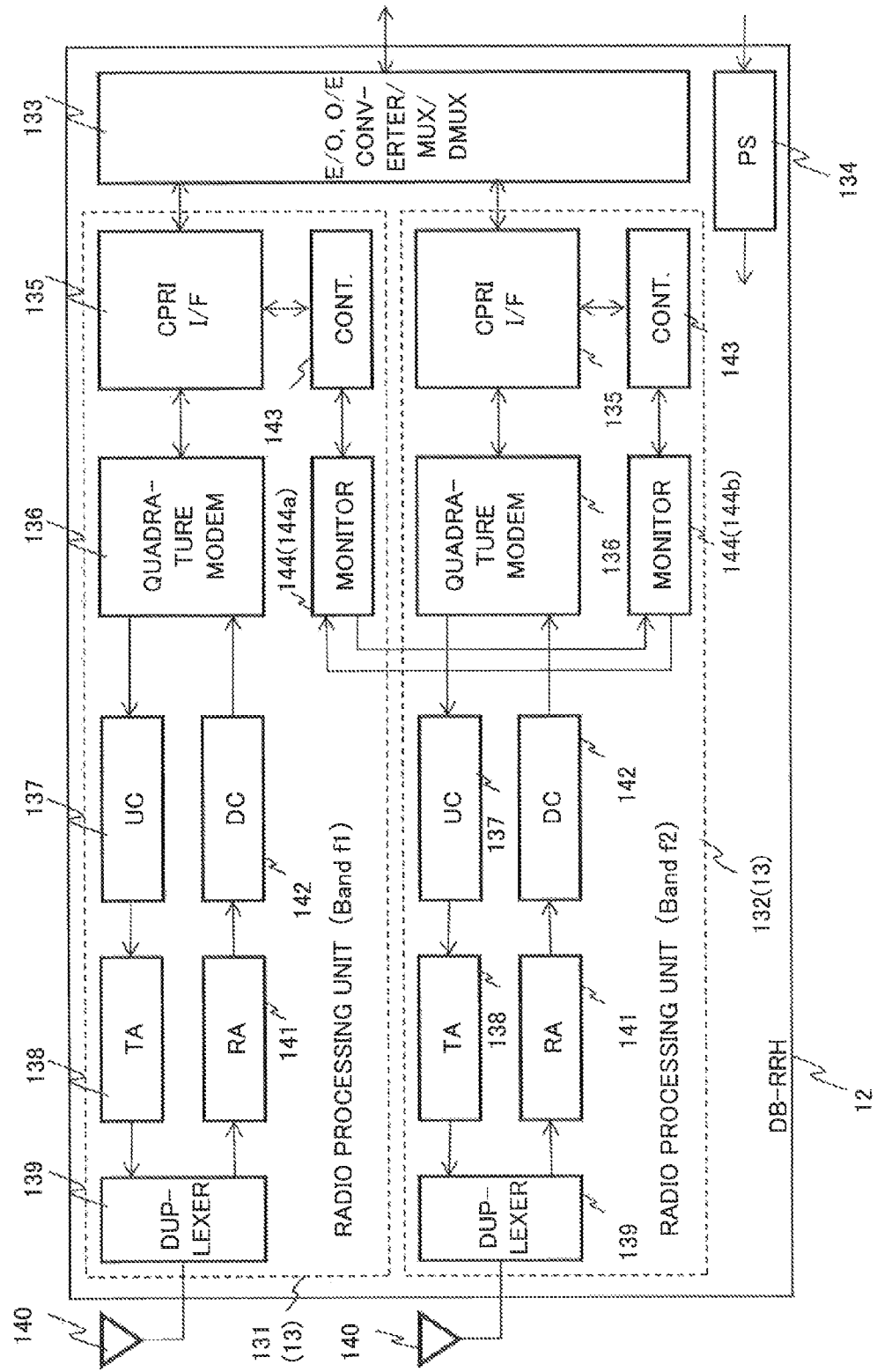
FIG. 10 illustrates an example of a functional configuration of a DB-RRH.

Description will be provided on an example of a configuration of each DB-RRH 12, hereinafter. FIG. 10 illustrates an example of a functional configuration of the DB-RRH 12, and FIG. 11 illustrates an example of a hardware configuration of the DB-RRH 12.

Figure 11:
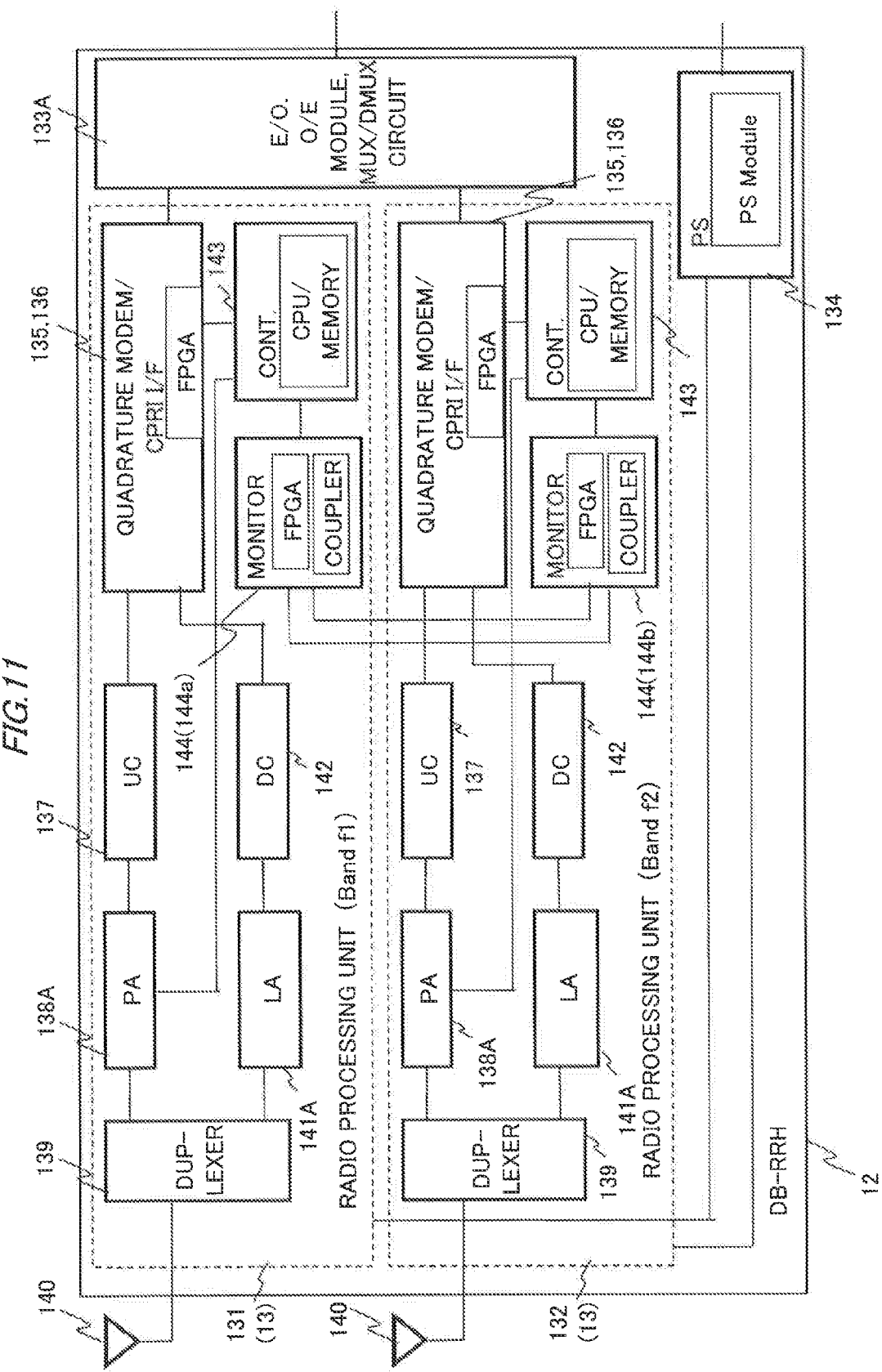
FIG. 11 illustrates an example of a hardware configuration of a DB-RRH.

As illustrated in FIG. 11, the DB-RRH 12 includes radio processors of two systems: a radio processor 131 which is a first RRH 13, and a radio processor 132 which is a second RRH 132. The DB-RRH 12 includes an E/O (and O/E) converter and multiplexer/demultiplexer 133 to which the radio processor 131 and the radio processor 132 are electrically connected, and a power supply 134 for supplying power to the radio processor 131, the radio processor 132, and the E/O converter and multiplexer/demultiplexer 133.

The radio processor 131 and the radio processor 132 have the identical configuration, and thus the radio processor 131 will be described as a representative thereof. The radio processor 131 includes a CPRI interface 135 connected to the E/O converter and multiplexer/demultiplexer 133, and a quadrature modem 136 connected to the CPRI interface 135. The radio processor 131 includes an up-converter (UC) 137 connected to the quadrature modem 136, a transmitting amplifier 138 connected to the up-converter 137, and a duplexer 139 connected to the transmitting amplifier (TA) 138. A transmitting/receiving antenna 140 is connected to the duplexer 139. The radio processor 131 includes a receiving amplifier 141 connected to the duplexer 139, a down-converter (DC) 142 connected to the receiving amplifier (RA) 141 and the quadrature modem 136, and a controller 143 connected to the CPRI interface 135.

The E/O converter and multiplexer/demultiplexer 133 carries out E/O conversion and O/E conversion of the CPRI interface signals that are transmitted and received between the E/O converter and multiplexer/demultiplexer 133 and the BBU 11, and also communicates with the BBU 11. The E/O converter and multiplexer/demultiplexer 133 carries out multiplexing and demultiplexing processing of signals pertinent to the two systems (radio processors 131 and 132). Specifically, the E/O converter and multiplexer/demultiplexer 133 carries out multiplexing processing and demultiplexing processing of signals transmitted and received between the BBU 11 and the radio processor 131, and of signals transmitted and received between the BBU 11 and the radio processor 132.

The CPRI interface 135 applies processing based on the CPRI protocol to the baseband signals. For example, the CPRI interface 135 maps the baseband signals as the IQ signals on the CPRI interface so as to generate the CPRI interface signals. The CPRI interface 135 converts the CPRI interface signals into the baseband signals.

The quadrature modem 136 carries out conversion processing between the baseband signals and the radio signals (RF (radio frequency) signals: analogue signals) using quadrature modulation and demodulation.

The up-converter 137 converts the RF signals transmitted from the quadrature modem 136 into a frequency thereof to be transmitted as radio waves. The transmitting amplifier 138 amplifies the RF signals whose frequency has been converted on the up-converter 137.

The duplexer 139 transmits the RF signals received from the transmitting amplifier 138 from the transmitting-receiving antenna 140. The duplexer 139 forwards the RF signals received on the transmitting-receiving antenna 140 to the receiving amplifier 141.

The receiving amplifier 141 amplifies the RF signals, and thereafter, transmits the RF signals to the down-co006Everter 142. The down-converter 142 converts the RF signals into a frequency thereof corresponding to the processing on the quadrature modem 136.

The controller 143 comprehensively controls the radio processor 131. For example, the controller 143 monitors a state (normality, abnormality (failure)) of each component of the radio processor 131, and detects failure. The controller 143 controls transmission power of the transmitting amplifier 138. For example, the controller 143 receives state information regarding a counterpart (the other system) from an counterpart monitoring unit 144, and increases or decreases the transmission power of the transmitting amplifier 138 of its own radio processor in accordance with content of the state information.

The counterpart monitoring (supervisory) unit 144 (counterpart monitoring unit 144a) is connected to another counterpart monitoring unit 144 (counterpart monitoring unit 144b) of the radio processor 132 through an internal line (internal communication path) so as to monitor the state of the other system (counterpart). The monitoring is carried out in such a manner that the counterpart monitoring unit 144 receives state information regarding the counterpart radio processor (RRH) transmitted from the counterpart monitoring unit 144 of the counterpart, and detects this state on the controller 143.

The state information may indicate at least normality or abnormality (failure) of the radio processor. The failure information indicating normality or abnormality in the sequences of FIG. 4A, FIG. 4B, FIG. 7A and FIG. 7B is state information indicating a state of "abnormality". In this manner, the radio processor 131 and the radio processor 132 mutually monitor the states of the radio processors of their counterparts through their counterpart monitoring units 144a and 144b. The state information may include information for identifying an abnormal location when the state information indicates the abnormal state. In this case, it may be determined on the radio processor that has received the state information whether or not the transmission power control is executed in accordance with the abnormal location. For example, such a setting is provided that at least carries out the transmission power control (reduction) when the transmitting amplifier 138 is abnormal.

As illustrated in the example of the hardware configuration of FIG. 11, the E/O converter and multiplexer/demultiplexer 133 may be embodied by using an E/O module, an O/E module, and a signal multiplexing/demultiplexing circuit in combination (block 133A in FIG. 11). The power supply 134 is embodied by using a power supply device (PS module).

The quadrature modem 136 and the CPRI interface 135 in the radio processor 131 (132) may be embodied by using an FPGA. The transmitting amplifier 138 is embodied by using a power amplifier (PA) 138A, and the receiving amplifier 141 is embodied by using a low-noise amplifier (LA) 141A.

The controller 143 includes a CPU that executes various programs, the various programs to be executed by the CPU, and a memory that stores data to be used at the time of executing the programs. The CPU is an example of a processor, and is used as a working area.

The counterpart monitoring unit 144 is embodied by including the FPGA and a photo-coupler, and generates state information in accordance with an instruction from the CPU, and transmits the state information in optical signal form through the photo-coupler to the counterpart monitoring unit 144 of the counterpart. The counterpart monitoring unit 144 includes an optical receiver (not illustrated), and obtains the state information by receiving the optical signals transmitted from the counterpart monitoring unit 144 of the counterpart, and then forwards the signals to the controller 143. The state information may be generated by the above counterpart monitoring unit 144, or the state information generated by the controller 143 may be received by the counterpart monitoring unit 144.

The signals transmitted and received between the counterpart monitoring units 144 are optical signals, but electric signals may be transmitted and received therebetween, instead. Interpretation of the state information may be conducted on the controller 143, or this may be conducted on the counterpart monitoring units 144, and a result thereof may be transmitted to the controller 143.

The above hardware configuration of the DB-RRH 12 has been described as an example, and the CPRI interface 135, the quadrature modem 136, the controller 143, and the counterpart monitoring unit 144 may also be embodied by using dedicated hardware, such as an ASIC.

<Operational Example of Transmission Power Control>

(Operational Example 1)

Figure 12:
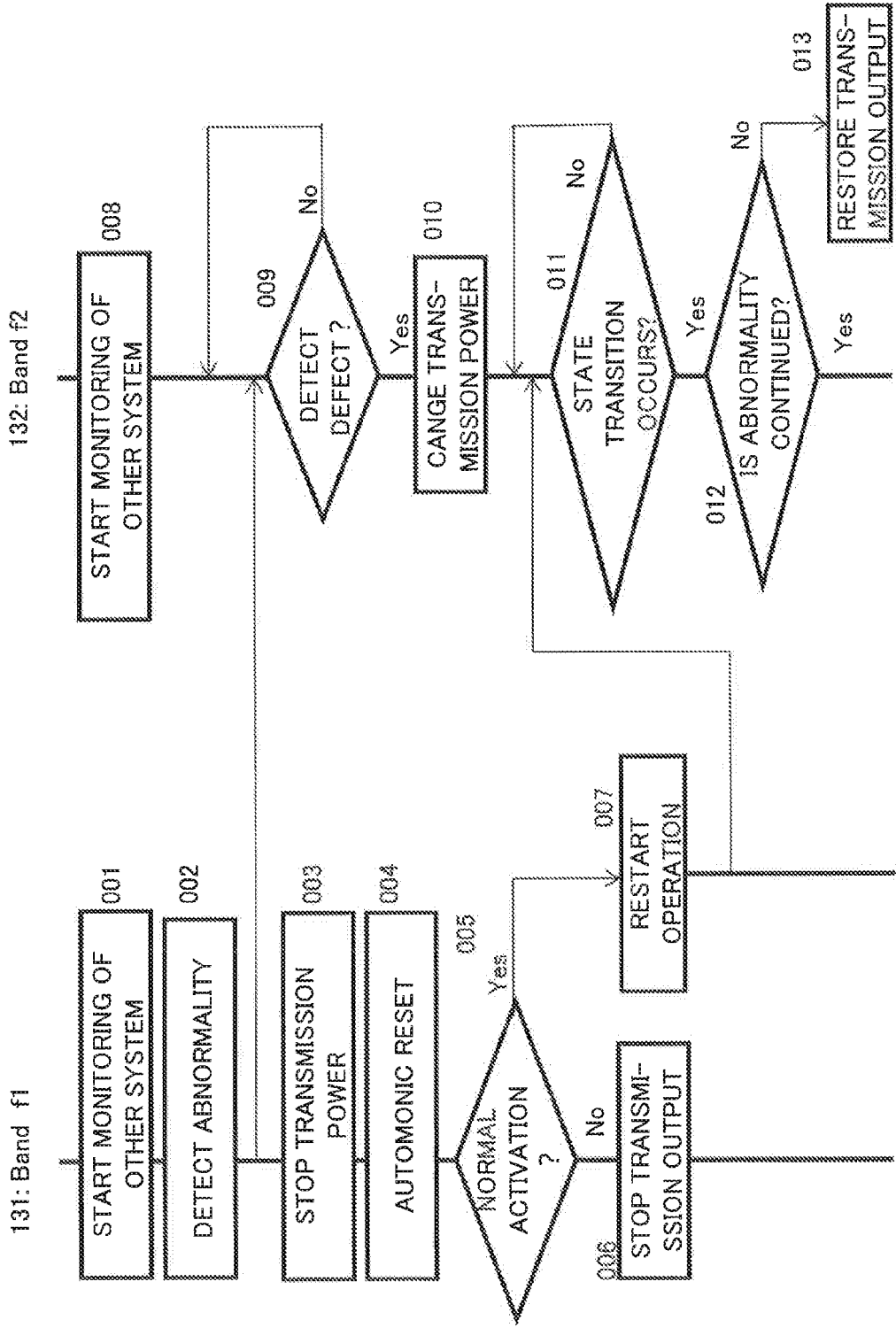
FIG. 12 is a flow chart indicating an operational example of the transmission power control.

FIG. 12 is a flow chart indicating an operational example of the transmission power control. In FIG. 12, when the controller 143 of the radio processor 131 detects abnormality (failure) in the radio processor 131 during monitoring the other system (radio processor 132) (001), the controller 143 controls the counterpart monitoring unit 144*a* to transmit the state information indicating failure to the counterpart monitoring unit 144*b* (002).

The controller 143 controls the transmitting amplifier 138 (power amplifier 138A) to stop its transmission output (003). Subsequently, the controller 143 controls the radio processor 131 to execute autonomous reset (restart-up processing) (004). This is because, when the state of failure is a soft error, the restart-up processing may solve the error.

The controller 143 determines whether or not the radio processor 131 normally starts up through the restart-up processing (005). When the radio processor 131 does not normally start up, the controller 143 controls the transmitting amplifier 138 to stop operation of the transmitting amplifier 138, thereby stopping the transmission output (006). The transmission output may be stopped by setting the operation of transmitting amplifier 138 to be off, or by stopping power supply to the transmitting amplifier 138.

When the radio processor 131 normally starts up, the operation is resumed (007). When the operation is resumed, the counterpart monitoring unit 144*a* transmits the state information indicating normality to the counterpart monitoring unit 144*b*.

On the other hand, when the radio processor 132 receives the state information indicating abnormality (failure) from the counterpart monitoring unit 144*b* during monitoring the other system (radio processor 131) (008), the radio processor 132 detects abnormality (failure) of the radio processor 132 (009).

The controller 143 of the radio processor 132 controls the transmitting amplifier 138 to reduce the transmission output (010). Thereafter, the controller 143 monitors the state information received from the counterpart monitoring unit 144*b*, and waits until state transition of the radio processor 131 occurs (011). Specifically, the controller 143 waits for the state information transmitted after the autonomous reset. In the present embodiment, such a configuration has been employed that the autonomous reset triggers transmission of the state information of its own system toward the counterpart system, so that the receiver of this state information may know the autonomous reset in the other system.

When the state information after the autonomous reset indicates no continuity of the abnormal state (indicating normality) (No in 012), the controller 143 controls the transmitting amplifier 138 to return the transmission power to the state before the failure occurs (013). To the contrary, when the state information indicates abnormality, the transmission output is maintained to be reduced.

(Operational Example 2)

The operational example 1 has been described by using an example of controlling the transmission power at two levels: the transmission output level in the normal state, and the transmission output level in the abnormal state. In the operational example 2, description will be provided on gradual control of the transmission output.

Figure 13:
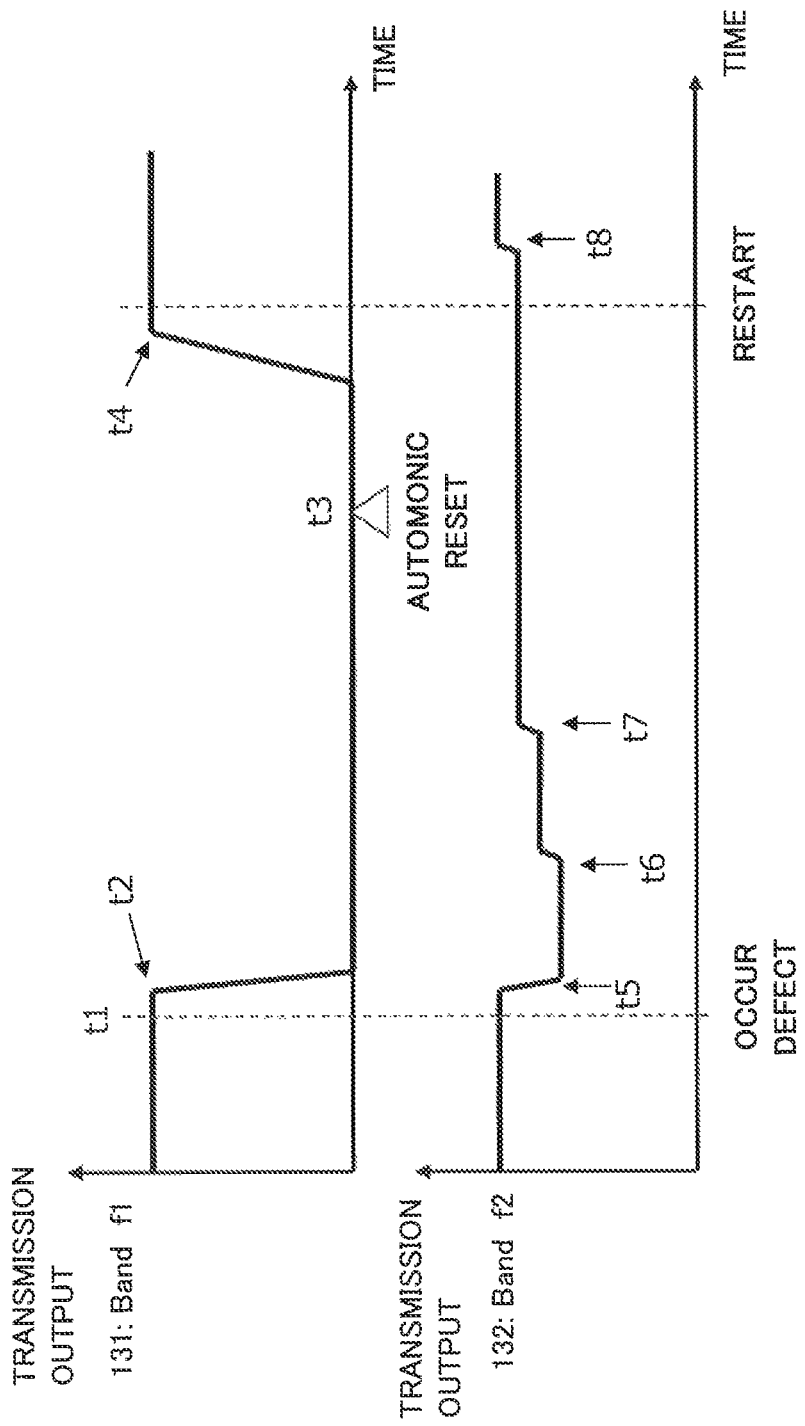
FIG. 13 illustrates an example of gradual transmission output control.

FIG. 13 illustrates an example of the gradual control on the transmission output. FIG. 13 illustrates the following operation of the radio processor 131. Specifically, abnormality occurs in the radio processor 131 at time t1, and the transmission output is stopped at time t2. The autonomous reset (restart-up) is then executed at predetermined time t3, and when the state shifts to a normal state, the transmission output is restored (restarted) to the state before the failure occurs.

Meanwhile the following operation is carried out in the radio processor 132. Specifically, the failure notification of the radio processor 131 is received at time t5, and the controller 143 then reduces the transmission output. Thereafter, at time t6, the controller 143 increases the transmission output by a predetermined value. In addition, at time t7, the controller 143 increases the transmission output by a predetermined value.

In the operational example 2, the radio processor 132, which has received the failure notification of the counterpart system, reduces the transmission output down to a predetermined level, and thereafter, gradually increases the transmission output. This configuration may reduce concentration of connection requests from the mobile terminals on the radio processor 132 immediately after the radio processor 131 stops the transmission output. Thereafter, the transmission output is gradually increased so that a geographical area (cell radius) of each mobile terminal that may connect to the radio processor 132 may be gradually returned to the state before the failure occurs. At time t2, when a certain mobile terminal disconnected from the cell C1 may be reconnected neither to the cell C2 nor to adjacent cells, for example, this mobile terminal is not able to restart communication until this mobile terminal moves. To the contrary, gradual increase in transmission output, and increase in cell radius allow this mobile terminal to be connected to the cell C2.

The transmission output is executed regardless of (asynchronously from) the operation of the radio processor 131 having failure. In the example of FIG. 13, at time t8 after the radio processor 131 restarts the operation, the transmission output level of the radio processor 132 is returned to the level before the failure occurs.

Figure 14:
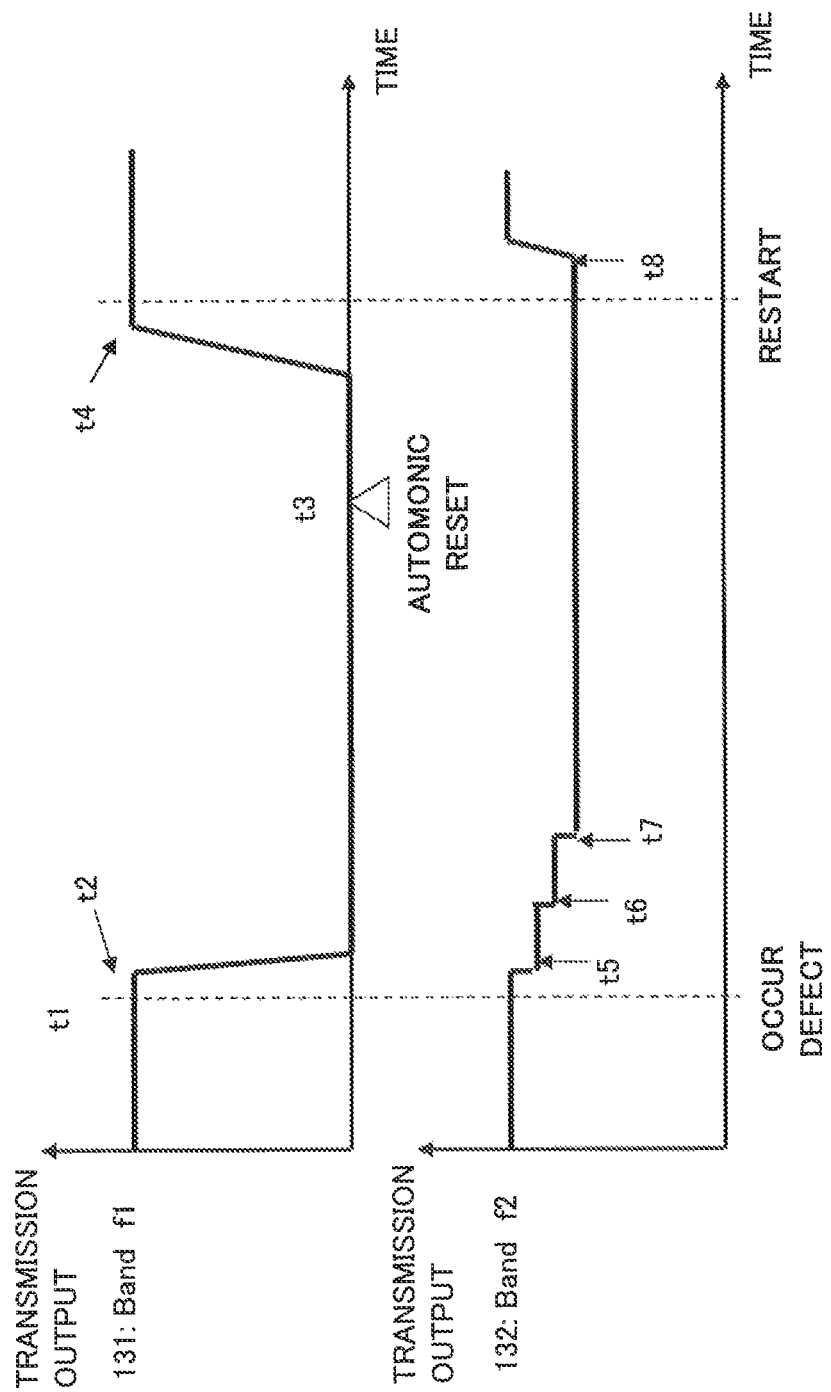
FIG. 14 illustrates an example of gradual transmission output control.

As indicated in FIG. 14, the transmission output control may be executed so as to be gradually reduced down to a predetermined level after failure of the counterpart system is detected.

<Advantageous Effects>

According to the first embodiment, in each DB-RRH 12, it is possible to prevent congestion due to concentration of connection requests on the radio processor 132 due to occurrence of abnormality in the radio processor 131.

Second Embodiment

Description will be provided on the second embodiment, hereinafter. The second embodiment has a configuration common to the configuration of the first embodiment, and thus their differences will be mainly described, and description of the common features thereof will be omitted.

Figure 15:
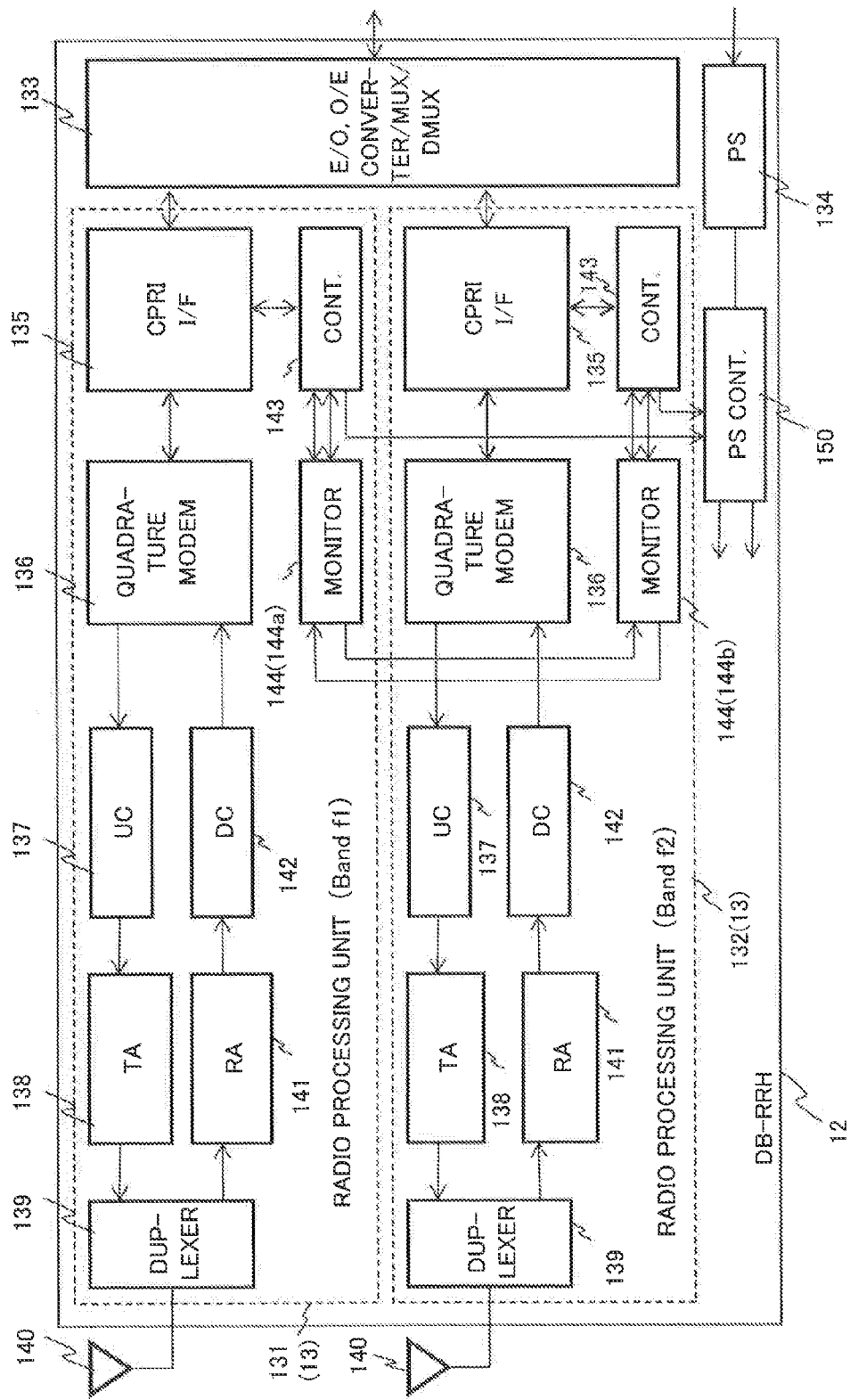
FIG. 15 illustrates an example of a configuration of a DB-RRH according to the second embodiment.
Figure 16:
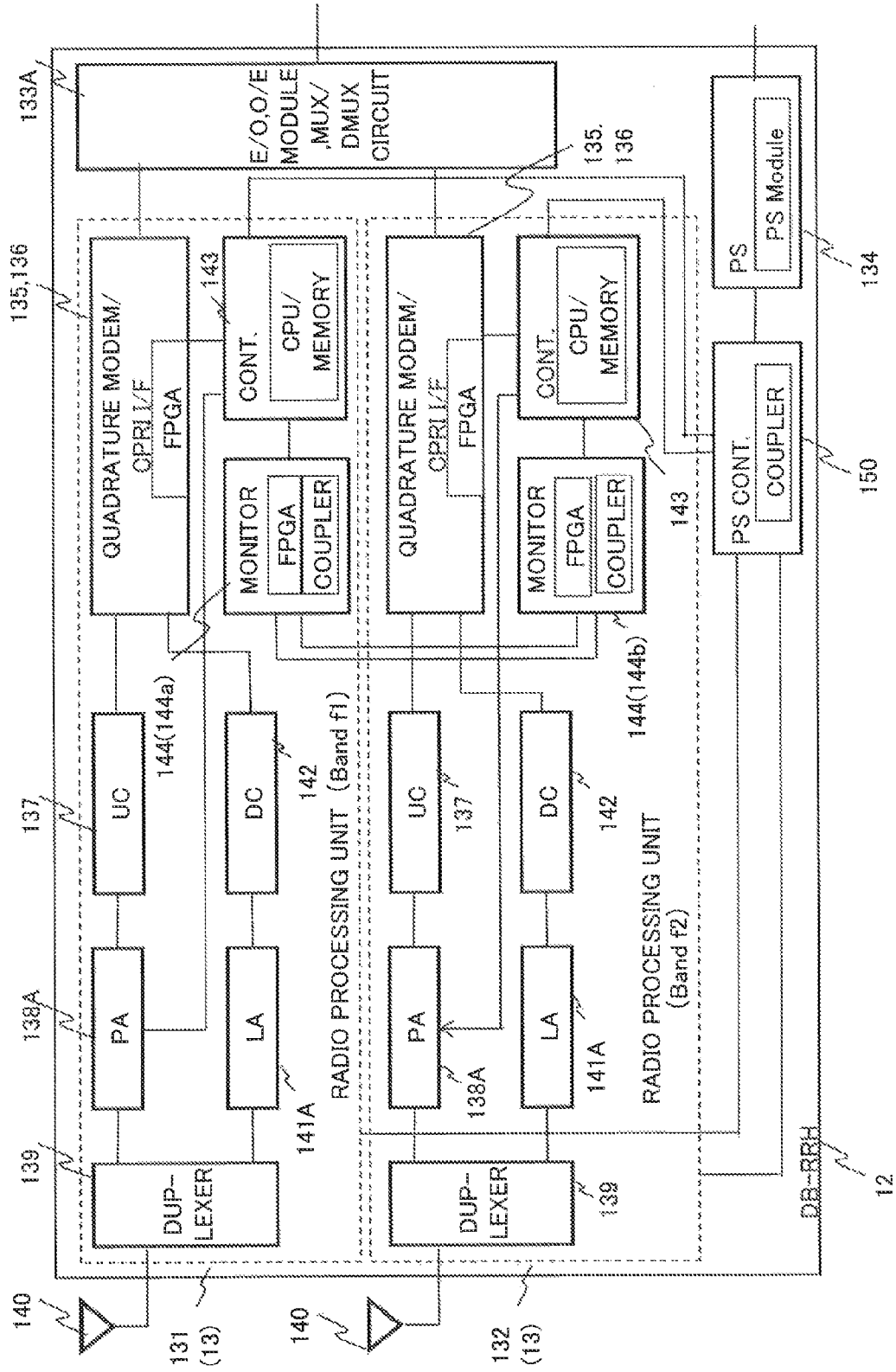
FIG. 16 illustrates an example of a hardware configuration of the DB-RRH illustrated in FIG. 15.

FIG. 15 illustrates an example of a configuration of each DB-RRH according to the second embodiment, and FIG. 16 illustrates a hardware configuration of the DB-RRH of FIG. 15. The differences from the first embodiment (FIG. 10 and FIG. 11) are as follows.

Specifically, in the second embodiment, the DB-RRH 12 further includes a power supply controller 150. The power supply controller 150 carries out supply or stop of supply of electric power fed from the power supply 134 to each component, in accordance with the control signal transmitted from each radio processor 131, 132.

The power supply controller 150 is constituted by a photocoupler as illustrated in FIG. 16. Each controller 143 includes a photo-coupler (not illustrated) that generates optical signals indicating stop of power supply to the other system (counterpart system), and provides the optical signals to the power supply controller 150. The power supply controller 150 receives the optical signals on its optical receiver, identifies a target radio processor to which the power supply is to be stopped, and blocks the power supply from the power supply 134 to the identified radio processor, thereby stopping the power supply to this radio processor.

In the second embodiment, as aforementioned, each of the radio processors 131 and 132 of each DB-RRH 12 includes the counterpart monitoring unit 144, and transmits the monitoring information (state information) to each other, so that the radio processors 131 and 132 may mutually monitor each other.

In addition, when abnormality occurs in the radio processor of the other system (counterpart) (e.g. radio processor 131), based on the result of the detected abnormality, the radio processor 132 decides to autonomously reduce its own transmission power output, and carries out this processing.

The radio processor 131 having abnormality executes the autonomous reset for self-diagnosis. When the abnormal state is still continuously detected on the radio processor 132 even after the autonomous reset, the radio processor 132 instructs the power supply controller 150 to stop the power supply to the radio processor 131.

Figure 17:
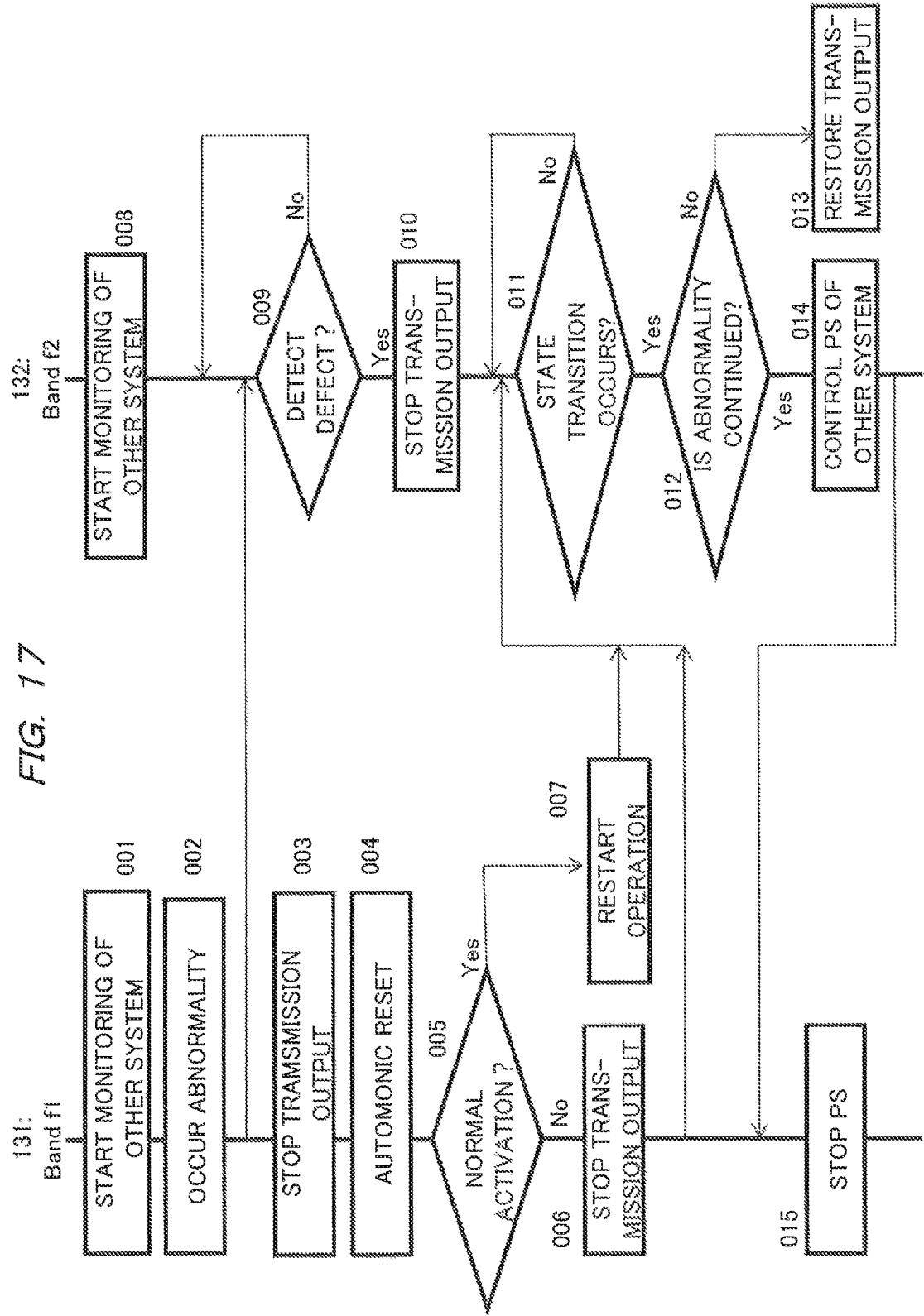
FIG. 17 is a flow chart indicating an operational example in the second embodiment.

FIG. 17 is a flow chart indicating an operational example in the second embodiment. Operations of 001 to 012 in FIG. 17 are the same as those of the first embodiment illustrated in FIG. 12, and thus description thereof will be omitted. In 012, when the state information indicates abnormality after the autonomous reset, the controller 143 of the radio processor 132 provides the power supply controller 150 with a control signal of instruction to stop the power supply to the radio processor 131 (014). In accordance with this instruction, the power supply controller 150 stops the power supply to the radio processor 131.

According to the second embodiment, when abnormality is continued even after the autonomous reset, the radio processor 132 stops the power supply to the radio processor 131. Accordingly electric power saving may be attained.

The above first and second embodiments have been described by using an example of controlling the transmission power (transmission output) on the radio processor 132 (second RRH 13) when failure occurs in the radio processor 131 (first RRH 13); and when failure occurs in the radio processor 132 (second RRH 13), the transmission power control is carried out on the radio processor 131 (first RRH 13). In other words, the operation is carried out in a reverse manner.
<Variation>

Figure 18:
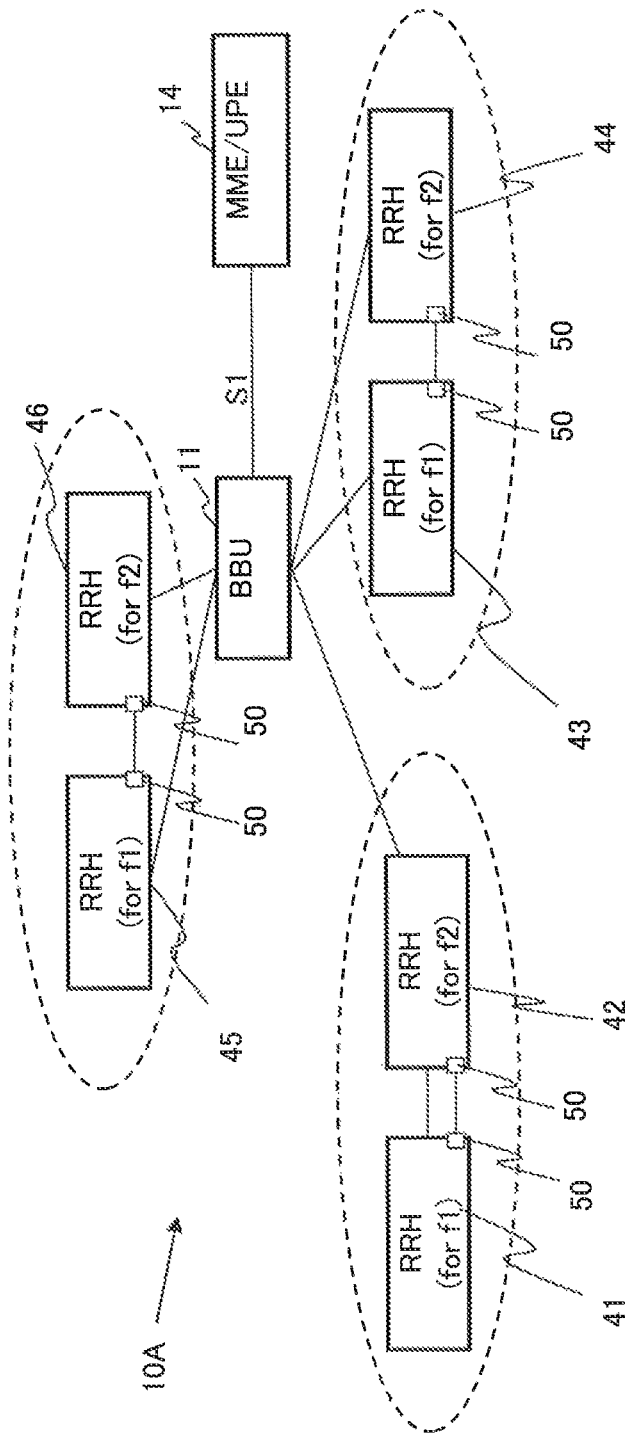
FIG. 18 is a drawing explaining a variation of the embodiments.

In the above first and second embodiments, the base station apparatus 10 to which the DB-RRHs 12 are applied has been described, and the same function as that of the DB-RRH 12 may be embodied by using two separate RRHs. For example, as illustrated in FIG. 18, the respective configurations of the DB-RRH 12A, the DB-RRH 12B, and the DB-RRH 12C may be embodied by using pair of the RRH 41 and the RRH 42, a pair of the RRH 43 and the RRH 44, and a pair of the RRH 45 and the RRH 46.

The RRHs 41, 43, and 45 use the frequency band f1, and the RRHs 42, 44, and 46 use the frequency band f2. As illustrated in FIG. 18, as a topology of each pair of the RRHs connected to the BBU 11, the following daisy chain type topology may be applicable: one (RRH 42) of the pair of the RRHs (RRH 41 and RRH 42) is connected to the BBU 11, and the other (RRH 41) is connected to the BBU through the one (RRH 42) of this pair. Alternatively, the following star type topology may be applicable: RRHs of each pair (pair of RRH 43 and RRH 44, and pair of RRH 45 and RRH 46 in FIG. 18) are both connected to the BBU 11.

Each of the RRHs 41 to 46 includes the radio processor 131 and the power supply 134 as illustrated in FIG. 15, for example. Note that the RRHs 43, 44, 45, and 46 include their own separate E/O converters, and the BBU 11 generates respective CPRI interface signals for the RRHs 43, 44, 45, and 46, and transmits these signals to the RRHs 43 to 46, respectively.

Meanwhile, the RRHs 41 and 42 include their own E/O converter and multiplexer/demultiplexer 133. It is configured that the CPRI interface signals received on the E/O converter and multiplexer/demultiplexer 133 of the RRH 42 are transmitted through the RRH 42 to the RRH 41, and are received on the E/O converter and multiplexer/demultiplexer 133 of the RRH 41.

Of course, it may also be configured that the E/O converter and multiplexer/demultiplexer 133 of the RRH 42 is connected to the RRH 41, so that demultiplexed signals for the RRH 41 are transmitted to the RRH 41, and CPRI signals to be multiplexed on the E/O converter and multiplexer/demultiplexer 133 of the RRH 42 are supplied from the RRH 41.

Between the RRHs of each pair, an interface between the RRHs is disposed so as to mutually transmit the monitoring information (state information) therebetween. Specifically, each RRH of each pair includes an interface circuit 50 between the RRHs instead of including the counterpart monitoring unit 144, and this interface circuit 50 of each pair are connected to each other via a communication line. Each interface circuit 50 is connected to the controller 143 of its own station.

The aforementioned state information is converted into a predetermined communication form between the interface circuits 50 between the RRHs, and then is transmitted and received therebetween. The power supply controller 150 as described in the second embodiment is included in each RRH of each pair, and the power supply stop instruction is transmitted through each interface circuit 50 between the RRHs to the counterpart system. The controller 143 that has received the power supply stop instruction controls the power supply controller 150 to stop the power supply of its own system.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A base station apparatus, comprising:
a first radio device to form a first cell that a first frequency band is used;
a second radio device to form a second cell that is overlaid with the first cell and is used a second frequency band different from the first frequency band; and
a radio control device being directly or indirectly connected to the first radio device and to the second radio device, and to perform processing of signals transmitted to and received from the first radio device, and of signals transmitted to and received from the second radio device;
wherein:
the first radio device includes a first monitor and a first controller;
the second radio device includes a second monitor and a second controller, the second monitor communicating with the first monitor via a communication path which does not pass through the radio control device;
the first controller reduces a transmission rower of the first radio device when the first monitor receives a failure state of the second radio device via the communication path; and
the second controller reduces a transmission power of the second radio device when the second monitor receives a failure status of the first radio device via the communication path.

2. The base station apparatus according to claim 1, wherein the first radio device and the second device form a dual bands radio apparatus as a pair associated with each other.

3. The base station apparatus according to claim 1, wherein each of the first controller and the second controller gradually increases the transmission power after the transmission power is reduced to a predetermined value.

4. The base station apparatus according to claim 1, wherein when each of the first monitor and the second monitor detects the failure state of a corresponding radio device being the first radio device or the second radio device after an autonomous reset of the corresponding radio device to remove the failure state thereof, the first controller or the second controller outputs an instruction to stop power supply to the corresponding radio device which is detected the failure state.

5. The base station apparatus according to claim 1, wherein the first radio device and the second radio device are accommodated in the same housing, and the first monitor and the second monitor are connected to each other through an internal communication path being the communication path.

6. The base station apparatus according to claim 1, wherein the first radio device and the second radio device are operational mutually and independently, and the first radio device and the second radio device are connected to each other through an interface of the communication path for transmitting and receiving the failure state.

7. The base station apparatus according to claim 1, wherein:
the first radio device and the second radio device form a dual bands radio apparatus as a pair associated with each other;
the dual bands radio apparatus comprises a monitor and a controller;
the controller of the dual bands radio apparatus, when the failure state of one of the first radio device and the second radio device is detected, transmits information indicating the failure state to the radio control device; and
the radio control device receiving the information carries out processing of allocating resources for signal processing relating to the one of the first radio device and the second radio device having the failure state to another of the first radio device and the second radio device or to one or more other radio devices.

8. The base station apparatus according to claim 7, wherein the one or more other radio devices include:
a third radio device to form a third cell that is adjacent to the first cell and the first frequency band is used; and
a fourth radio device to form a fourth cell that is adjacent to the second cell and overlaid with the third cell and the second frequency band is used, and
wherein the radio control device allocates the resources for the signal processing relating to the one of the first radio device and the second radio device to the third radio device and to the fourth radio device.

9. A radio device along with another radio device being connected to a radio control device, the radio device forming a second cell overlaid with a first cell which is formed by the another radio device and a first frequency band is used, the radio device comprising:
a monitor to monitor a failure state of the another radio device, wherein the monitor receives the failure state of the another radio device via a communication path which is formed between the radio device and the another radio device and does not pass through the radio control device, and the monitor detects a failure state of the radio device and transmits the detected failure state to the another radio device via the communication path; and
a controller to reduce transmission power to the second cell when the monitor detects the failure state of the another radio device.

10. A method of transmission power control performed by a radio device along with another radio device being connected to a radio control device, the radio device forming a second cell overlaid with a first cell which is formed by the another radio device and a first frequency band is used, the method comprising:
monitoring a failure state of the another radio device, wherein the failure state of the another radio device is received from the another radio device via a communication path which is formed between the radio device and the another radio device and does not pass through the radio control device, and the monitor detects a failure state of the radio device and transmits the detected failure state to the another radio device via the communication path; and
reducing transmission power of radio waves to be transmitted to the second cell when the failure state of the another radio device is detected.

* * * * *